United States Patent
Schneider et al.

(10) Patent No.: US 11,358,249 B2
(45) Date of Patent: Jun. 14, 2022

(54) METHOD, INSTALLATION AND SYSTEM FOR PROCESSING OPTICAL LENSES

(71) Applicant: Schneider GmbH & Co. KG, Fronhausen (DE)

(72) Inventors: Gunter Schneider, Marburg (DE); Stephan Huttenhuis, Niederweimar (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 355 days.

(21) Appl. No.: 15/773,728

(22) PCT Filed: Nov. 7, 2016

(86) PCT No.: PCT/EP2016/001835
§ 371 (c)(1),
(2) Date: May 4, 2018

(87) PCT Pub. No.: WO2017/080639
PCT Pub. Date: May 18, 2017

(65) Prior Publication Data
US 2018/0318978 A1    Nov. 8, 2018

(30) Foreign Application Priority Data

Nov. 12, 2015   (DE) .................... 10 2015 014 580.0
Nov. 24, 2015   (DE) .................... 10 2015 015 040.5

(51) Int. Cl.
*B24B 13/00*    (2006.01)
*B29D 11/00*    (2006.01)
(Continued)

(52) U.S. Cl.
CPC ...... *B24B 13/0037* (2013.01); *B24B 27/0023* (2013.01); *B29D 11/00423* (2013.01); *C03C 19/00* (2013.01)

(58) Field of Classification Search
CPC . B24B 27/0023; B24B 13/0037; B65G 43/10; C03C 19/00
See application file for complete search history.

(56) References Cited

U.S. PATENT DOCUMENTS

| 4,006,563 A | 2/1977 | Charlot |
| 4,544,318 A | 10/1985 | Nagatomo et al. |
| (Continued) |

FOREIGN PATENT DOCUMENTS

| CN | 102226876 A | 10/2011 |
| CN | 105398068 A | 3/2016 |
| (Continued) |

OTHER PUBLICATIONS

Modulo Line, Automated Lens Processing, Intelligently Combined, Jun. 5, 2014, pp. 1-4 Retrieved From Internet: URL:http://www.schneider-om.com/fileadmin/schneider-om/pdf/Modulo_Line_06-2014_web.pdf [retrieved on Jan. 19, 2017].

(Continued)

*Primary Examiner* — Joel D Crandall
(74) *Attorney, Agent, or Firm* — David S. Safran; Roberts Calderon Safran & Cole, P.C.

(57) ABSTRACT

A method, an installation and a system for processing optical workpieces in which workpieces are conveyed to individual processing apparatus or processing lines corresponding to an assignment. The respective assignment preferably takes into consideration assignment parameters, such as the availability and capability of processing apparatus and/or processing lines. The assignment that already has been carried out is examined before the actual or ultimate conveying and/or when there is a change in the assignment parameters and optionally is changed in a corresponding manner, taking into consideration the current assignment parameters, in order to adapt to current circumstances. As an alternative or in addition, jobs for processing workpieces are forwarded to (Continued)

the processing installations at different sites based on corresponding assignment parameters. Optionally, an examination and, as appropriate, a change in the assignment are made when new jobs or significant changes in the assignment parameters are detected.

22 Claims, 12 Drawing Sheets

(51) Int. Cl.
*B24B 27/00* (2006.01)
*C03C 19/00* (2006.01)

(56) References Cited

U.S. PATENT DOCUMENTS

| | | | |
|---|---|---|---|
| 4,727,684 A | 3/1988 | Kobayashi et al. | |
| 5,024,315 A | 6/1991 | Ward | |
| 5,372,241 A | 12/1994 | Matsumoto | |
| 5,551,348 A * | 9/1996 | Matsumoto | B23Q 7/14 |
| | | | 104/88.02 |
| 5,555,504 A | 9/1996 | Lepper et al. | |
| 5,744,357 A | 4/1998 | Wang et al. | |
| 5,804,107 A | 9/1998 | Martin et al. | |
| 5,844,802 A | 12/1998 | Lepper et al. | |
| 5,884,746 A | 3/1999 | Leisner et al. | |
| 5,947,259 A | 9/1999 | Leisner et al. | |
| 6,039,899 A | 3/2000 | Martin et al. | |
| 6,071,440 A | 6/2000 | Wang et al. | |
| 6,336,546 B1 | 1/2002 | Lorenz | |
| 6,439,870 B1 | 8/2002 | Marceau et al. | |
| 6,618,692 B2 | 9/2003 | Takahashi et al. | |
| 6,654,663 B1 | 11/2003 | Jokela | |
| 6,716,294 B1 | 4/2004 | Vetrini | |
| 6,738,682 B1 | 5/2004 | Pasadyn | |
| 6,836,692 B2 | 12/2004 | Leavitt et al. | |
| 6,854,583 B1 | 2/2005 | Horn | |
| 6,914,893 B2 | 7/2005 | Petite | |
| 7,090,559 B2 | 8/2006 | Vulich et al. | |
| 7,801,641 B2 | 9/2010 | Yoshikawa et al. | |
| 8,241,534 B2 | 8/2012 | Akiyama | |
| 8,397,898 B2 | 3/2013 | Buchmann et al. | |
| 8,616,150 B2 | 12/2013 | Savoie et al. | |
| 8,784,160 B2 | 7/2014 | Breme | |
| 9,031,682 B2 | 5/2015 | Tanaka et al. | |
| 9,340,669 B2 | 5/2016 | Schneider et al. | |
| 9,840,373 B2 | 12/2017 | Schneider | |
| 9,908,714 B2 | 3/2018 | Schneider | |
| 2002/0035477 A1 | 3/2002 | Takahashi et al. | |
| 2003/0017794 A1 | 1/2003 | Kozakai et al. | |
| 2003/0115510 A1 | 6/2003 | Takayama | |
| 2008/0184114 A1 | 7/2008 | Hano | |
| 2009/0228129 A1 | 9/2009 | Moyne et al. | |
| 2011/0166688 A1 | 7/2011 | Moyne et al. | |
| 2012/0209416 A1 * | 8/2012 | Tanaka | B24B 13/0031 |
| | | | 700/112 |
| 2013/0270759 A1 | 10/2013 | Schneider et al. | |
| 2014/0067108 A1 | 3/2014 | Pedigo et al. | |
| 2014/0228995 A1 | 8/2014 | Tanaka et al. | |
| 2015/0053530 A1 * | 2/2015 | Schneider | B29D 11/00432 |
| | | | 198/347.1 |
| 2015/0105892 A1 | 4/2015 | Townsend et al. | |
| 2015/0314411 A1 | 11/2015 | Samukawa et al. | |
| 2016/0149996 A1 | 5/2016 | Eckert et al. | |
| 2017/0269573 A1 | 9/2017 | Holzkamper et al. | |

FOREIGN PATENT DOCUMENTS

| | | | | |
|---|---|---|---|---|
| DE | 36 14 165 A1 | 10/1987 | | |
| DE | 29823464 U1 | 6/1999 | | |
| DE | 198 15 728 A1 | 10/1999 | | |
| DE | 695 22 147 T2 | 4/2002 | | |
| DE | 10353553 A1 | 6/2005 | | |
| DE | 102004021696 A1 | 11/2005 | | |
| DE | 102007059303 A1 | 6/2009 | | |
| DE | 202012011690 U1 * | 3/2013 | | B29D 11/0023 |
| EP | 2489469 A1 | 8/2012 | | |
| GB | 1567587 A | 5/1980 | | |
| GB | 2344439 A | 6/2000 | | |
| JP | S60146646 A | 8/1985 | | |
| WO | 02087861 A2 | 7/2002 | | |
| WO | 2008042277 A1 | 4/2008 | | |

OTHER PUBLICATIONS

English Translation of PCT International Preliminary Report on Patentability dated May 15, 2018 and Written Opinion.
Der Augen Optiker: "Technik für neue Ansprüche an Brillengläser", 2003, pp. 50-51.—ISSN 0004-7929 (English-language translation attached).
Schiffhauer, Nils: "Durchbrüche an der Wellenfront", Frankfurter Allgemeine Sonntagszeitung, Apr. 5, 2009, 4 pages, No. 14 (English-language translation attached).
Rexroth Bosch Group: "Transfersystem TS 2plus", Apr. 2011, pp. 0-4, 1-1 to 1-10, 4-1 to 4-25 & 5-1 to 5-40.
Konrad, Beat: "On-block Manufacturing Back side processing advantages", https://www.satisloh.com/fileadmin/contents/Technical-papers/On-Block-Manufacturing_EN.pdf, May 6, 2016, pp. 1-23, XP055471305.
Kevin Cross: "Where Is Automation Taking the 21st Century Lab?", Internet article, XP-002772552, Jul. 25, 2017, pp. 1-5, https://opticallabproducts.com/where-is-automation-taking-the-21st-century-lab/.
Hao Zhang et al., "Remote service and remote engineering support system of manufacturing enterprises", Tongji University Press, May 2002, pp. 197-199, ISBN 7-5608-2421-8, 1st Edition, Shanghai, China.

* cited by examiner

METHOD, INSTALLATION AND SYSTEM FOR PROCESSING OPTICAL LENSES

BACKGROUND OF THE INVENTION

Field of the Invention

This invention relates to a method for processing preferably optical workpieces, an installation for processing preferably optical workpieces, as well as a system for processing preferably optical workpieces.

Description of Related Art

The processing of optical workpieces, such as lenses, is carried out in multiple steps and/or in multiple separate processing apparatus. The processing can comprise in particular a blocking, joining or other (temporary) connection, such as adhesion with adhesive tape, a delaying, intermediate storing or sorting or stacking, a shaping or machining, a polishing, a coating, a testing or measuring, a marking, a coating and/or a cleaning.

This invention relates in particular to an installation with at least one processing line for processing preferably optical workpieces and/or lenses, especially preferably eyeglass lenses. The processing line comprises multiple, in particular (largely) independently-operating processing apparatus for various types of processing. Especially preferably, the processing line also comprises multiple processing apparatus for the same processing in order, for example, to increase the throughput of the processing line. If necessary, the installation comprises multiple processing lines that are in particular operated independently of one another and especially preferably an upstream transport system in order to convey the workpieces selectively to the processing lines.

International Patent Application Publication WO 2013/131656 A2 discloses an installation and a method for processing optical lenses, whereby lenses or lens carriers with lenses are selectively conveyed to independently-operating processing apparatus, which form a processing line. Jobs with lenses that are to be processed, processing plans, status information, process data and the like are managed by a central system control or a central display system and are displayed, if necessary. The conveying of lenses selectively to various processing apparatus and in any order together with the independently-operating processing apparatus, which request jobs autonomously and can route them to said apparatus, allows for a significantly more flexible processing and in particular also a significantly simpler expansion of existing installations than earlier processing lines. In general, a further optimization of the use of the processing apparatus is difficult, but desirable.

SUMMARY OF THE INVENTION

The object of this invention is to indicate a method, an installation and a system for processing preferably optical workpieces or lenses, wherein an efficient processing is made possible in particular also taking into consideration current conditions.

The above-mentioned object is achieved by a method, by an installation and by a system as described herein.

According to one aspect of this invention, the workpieces are preferably conveyed by means of a transport system selectively to one of multiple processing lines corresponding to an assignment. The assignment of already-assigned workpieces is preferably examined upon detection of a new workpiece or job that is to be processed and/or in each case before the actual transfer of a workpiece from the transport system to the assigned processing line—in particular taking into consideration or being based on assignment parameters—and optionally replaced by a new assignment, thus, in particular, changed or adapted.

Thus, an optimal utilization of the installation and/or processing lines and/or an especially efficient processing can be achieved or at least supported, since in particular even in the case of manufacturing and boundary conditions that change highly dynamically, a quick reaction in terms of a self-correction of the entire installation is made possible or supported to ensure quick discovery of an optimum, for example with respect to resource utilization.

The proposed examination of the assignment and optional new assignment can also be viewed as an optimized or adaptive pre-control.

The proposed examination of the assignment and optional new assignment makes possible in particular a simplification of the production planning system and/or high equipment utilization and/or a high flexibility, for example in the case of loss of individual processing apparatus or processing lines.

In the case of the proposed examination of the assignment and optional new assignment, various assignment parameters—in particular, just as in the original (first) assignment—can be taken into consideration, which parameters contain or reflect in particular the availability and capability of individual processing apparatus and/or processing lines and/or the processing times, processing sequences, and/or other processing requirements.

The proposed examination of the assignment and optional new assignment can also be combined with processing lines, which have (largely) independently-operating processing apparatus, which can request their workpieces for the next processing (autonomously) and can let said workpieces be conveyed to themselves. In this connection, in turn, characteristics or priorities, such as requirements with respect to processing accuracy, processing time, tool availability or other capabilities or the like, can also be taken into consideration by the respective processing apparatus and/or by corresponding interventions or comments, for example of the (central) system control of the installation or a central line control of the respective processing line.

According to another, independently-achievable aspect of this invention, the workpieces are conveyed preferably by means of a transfer system to independently-operating processing apparatus or are requested by them corresponding to an assignment. The assignment of already-assigned workpieces is examined after or before any processing or before any conveying of the already-assigned workpiece and optionally is replaced by a new assignment. Also, with this examination of the assignment and optional new assignment, assignment parameters, in particular in the above-mentioned sense, can again be taken into consideration.

The proposed examination of the assignments and optional new assignment is conducive to an optimal utilization of the installation and/or processing apparatus and/or to an especially efficient processing, since in particular even in the case of manufacturing and boundary conditions that change highly dynamically, a quick reaction in terms of a self-correction of the entire installation is made possible or at least supported to ensure quick discovery of an optimum, for example with respect to resource utilization.

According to another, also independent, aspect of this invention, jobs for the processing of the workpieces are forwarded from a system control corresponding to an assignment selectively to a first installation with at least one processing line at a first site or to a second installation with at least one processing line at a second (different) site. Preferably, the assignment of already-assigned jobs is examined upon detection of a new job and/or in each case before the actual (first) processing of a workpiece in an installation and/or processing line and optionally is replaced by a new assignment. The assignment or new assignment is preferably made again based on assignment parameters, in particular in the above-mentioned sense.

Thus, an optimal utilization of the installations and/or processing lines and/or an especially efficient processing can be achieved or at least supported, since in particular even in the case of manufacturing and boundary conditions that change highly dynamically, a quick reaction in terms of a self-correction of the entire system is made possible or supported to ensure quick discovery of an optimum, for example with respect to resource utilization.

According to one aspect of this invention, a proposed installation is distinguished in particular by a system control, which is designed in such a way that the assignment of already-assigned workpieces is examined upon detection of a new workpiece or job that is to be processed and/or in each case before the actual transfer of a workpiece to the assigned processing line, and optionally is replaced by a new assignment. The transport system then conveys the workpieces to the processing lines corresponding to the assignment or new assignment. In this connection, in turn corresponding advantages arise, as in the case of the above-mentioned method.

According to another, independent aspect of this invention, a proposed installation for processing preferably optical workpieces is distinguished in particular in that the system control or a processing line is designed in such a way that the assignment of already-assigned workpieces is examined after or before any processing or before any conveying to a processing apparatus of the processing line and is optionally replaced by a new assignment. Also, here, corresponding advantages arise, as already described above with the corresponding method.

According to another, also independently-achievable aspect of this invention, a proposed system for processing preferably optical tools has two installations at different sites, which each have at least one processing line with in particular multiple processing apparatus for processing the workpieces. In addition, the system has a system control for managing jobs for the processing of workpieces and forwarding jobs to the installations corresponding to an assignment. Preferably, the system control is designed for examination of already-assigned jobs upon detection of a new job and/or in each case before the actual beginning of the processing of a workpiece and optionally for a new assignment. In particular, the assignment or new assignment is carried out again based on assignment parameters, in particular in the sense that is already described above. Thus, corresponding advantages also arise here, as with the method that is already described above.

According to another, independent aspect of this invention, the proposed installation and/or the transport system thereof is preferably designed for circulation of the workpieces before the (selective) conveying of workpieces to one of the processing lines. This makes possible a very simple achievement of a selective conveying and optional intermediate storage.

Especially preferably, a double-ring arrangement can be formed when the transport system that is upstream from the processing lines forms a first ring arrangement, and one or more processing lines connected thereto form another ring arrangement for the respective circulation or circular conveying of workpieces, in particular lenses or lens carriers with lenses.

Preferably, the workpieces or lenses or lens carriers with lenses are selectively conveyed to different processing apparatus of a processing line for independent processing. In particular, the workpieces are independently conveyed by conveying apparatus in the processing apparatus, wherein the workpieces are temporarily accommodated by transfer apparatus between the processing apparatus and are selectively conveyed onward to the next processing apparatus or a parallel transport track. In this connection, the transfer apparatus are controlled by a preferably central or common control apparatus, wherein the conveying apparatus of the processing apparatus are preferably controlled by, however, the respective processing apparatus or the machine control thereof. This simplifies the control and allows for in particular an optimized processing with the individual processing apparatus. In addition, by this, extension of the installation and a connection of additional processing apparatus are significantly facilitated.

In general, it is noted that the required processing steps and sequence thereof, in order to manufacture a processed or finished workpiece from a blank, are preferably determined in a so-called processing plan, but in the case of multiple processing apparatus for the same processing, for example, for polishing, the respective apparatus that is actually to be used can be selected. The independent processing by the processing apparatus is preferably defined such that the processing in the respective apparatus proceeds independently from other processing and independently from the transfer system, wherein, however, the sequence of the processing steps is preset or maintained. The actual processing state is reflected in the processing status, which indicates in particular which processing has already been done or shall be done next, wherein this is especially preferably carried out with reference to the corresponding processing plan for the respective workpiece.

As an alternative or in addition, the independent processing by the processing apparatus is preferably defined in such a way that the processing apparatus can automatically and/or independently select and/or request workpieces that are to be processed from a central control system and/or can let said workpieces be conveyed to them by said control system— especially preferably taking into consideration the required processing.

This selection can selectively be carried out on a logical level or on the physical level. With the selection on the logical level, the respective processing apparatus can select, for example, a job or a data set with information on a lens that is to be processed from a data storage unit, database server, a system control or the like, and can then convey (or let be conveyed) this workpiece or the corresponding carrier with this workpiece to itself.

In the case of selection on the physical level, a processing apparatus can detect or identify, for example, workpieces that are to be processed or their carriers—in particular by means of a sensor or the like—and can select an appropriate workpiece taking into consideration the respective job or data set with information for the required processing, and can convey (or let be conveyed) said workpiece to itself for processing. In this connection, an at least largely autonomous processing of lenses by the individual processing apparatus is achieved, so that in particular in the case of the extension of installations, an otherwise required, very expensive reprogramming or new programming of central control systems can be completely omitted or at least minimized.

A preferred aspect of this invention thus lies in particular in the fact that the processing apparatus operate at least as much as possible largely automatically and/or independently, so that especially preferably, the processing apparatus fetch or request individual workpieces from the transfer system in order to perform a required processing, and then return the processed workpieces again to the transfer system, i.e., feed said workpieces back into the conveying or the conveying circuit. This autonomy and/or independence of the processing apparatus significantly simplifies the incorporation of additional or new processing apparatus into the installation.

In the case of an independently-operating processing apparatus in the above-mentioned sense, for installation optimization, an important issue is who gives the command that a new workpiece has to be requested or loaded up, and who (ultimately) determines or changes the assignment of which workpiece from which processing apparatus is processed (next). Preferably or according to the proposed solution, the (central) system control and/or the processing line is provided and/or designed for this (ultimate) determination and/or a change or new assignment that is carried out (only if necessary).

In the case of an installation with multiple, preferably independently-operating, processing lines, it is advantageous for installation optimization or it is provided to examine and optionally to adapt or to change—thus, in particular, to replace with a new assignment—the assignment of workpieces to a specific processing line before the actual conveying to this processing line is done and/or when a new job or workpiece is detected. In this case, in particular new or current information (assignment parameters), such as the availability of a processing line and/or specific processing apparatus, can then also be taken into consideration in order to make possible or to ensure in particular efficient processing and/or quick or economical processing.

The alternative or additionally provided central management of jobs for processing workpieces, in particular lenses or eyeglass lenses, is correspondingly advantageous, wherein the jobs are selectively forwarded to one installation from multiple installations at various sites, taking into consideration in particular assignment parameters, which also take into consideration in particular the availability of corresponding blanks, processing capacities and capabilities. At the corresponding installation, the job-specific processing in particular of a blank that is already present there can then be carried out in a desirable way. The (finished) processed workpiece, in particular an eyeglass lens, can then be sent off, for example, to the delivery address. In this way, in addition to an optimal utilization, even very short delivery times can be achieved, since, for example, different availabilities, in particular also based on different time zones of the various sites, of the installations can be taken into consideration.

According to another, preferably independently-achievable aspect of this invention, processing apparatus are set up or equipped for blocking (temporary connection of workpieces with a holder or block piece) for various block sizes, and the workpieces are conveyed to one of the processing apparatus based on the appropriate or desired block size in particular according to a previous assignment by means of the transfer or transport system that is assigned to the processing apparatus. Especially preferably, these processing apparatus for blocking, optionally together with an upstream stacker or storage unit, in particular for preliminary sorting, and/or a downstream processing apparatus for intermediate storage, form a blocking line or processing line. This blocking line or processing line can be upstream in particular from multiple processing lines for the further processing of the workpieces. Thus, especially efficient processing is made possible.

The above-mentioned and subsequent aspects and features of this invention can be combined with one another as desired, but also can be implemented in each case independently of one another.

Other aspects, features, advantages and properties of this invention will be apparent from the following description of preferred embodiments in conjunction with the accompanying drawings.

BRIEF DESCRIPTION OF THE DRAWINGS

FIG. 1 shows a schematic depiction of a proposed installation with multiple processing apparatus and transfer apparatus that are arranged in-between;

DETAILED DESCRIPTION OF THE INVENTION

In the figures, the same reference numbers are used for the same or similar components and apparatus, wherein the same or corresponding advantages and properties are produced, even when a repeated description is omitted.

Figure 1:
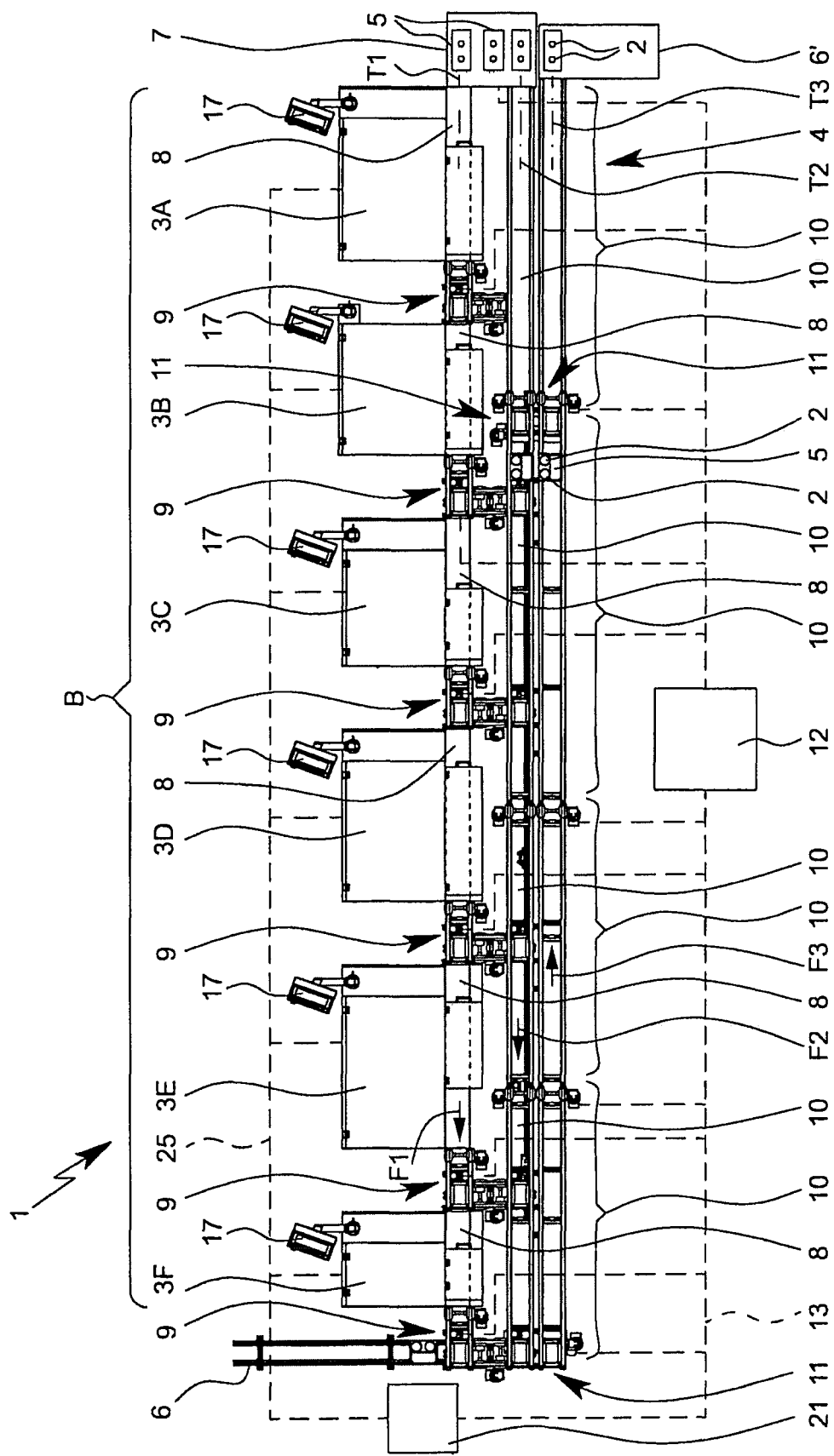

In a schematic depiction, FIG. 1 shows a proposed device or installation 1 for processing preferably optical workpieces, in particular lenses 2, i.e., a lens-processing installation. Subsequently, as an especially preferred embodiment, more detailed discussion will focus primarily on the processing of lenses for eyeglasses or eyeglass lenses. Preferably, however, these explanations correspondingly also apply for the processing of other lenses 2 or in general optical workpieces.

The installation 1 has multiple separate processing apparatus 3 for independent processing of lenses 2. For example, the installation 1 can have in particular at least one processing apparatus 3A for the blocking (temporary connection with a holder) of lenses 2, a processing apparatus 3B for intermediate storage of lenses 2 (preferably for cooling after blocking), a processing apparatus 3C for shaping, in particular machining or milling of lenses 2, a processing apparatus 3D for polishing lenses 2, a processing apparatus 3E for examining or measuring lenses 2, a processing apparatus 3F for marking lenses 2 and/or a processing apparatus 3G for coating lenses 2 (indicated in FIG. 5).

As necessary, multiple similar processing apparatus 3, for example, two or more processing apparatus 3, can also be present or integrated into the installation 1 for the same processing. For example, multiple processing apparatus 3C can be provided for shaping processing, multiple processing apparatus 3D for polishing, etc. This depends in particular on the throughput of the various processing apparatus 3 and/or the desired processing. A special advantage of the proposed installation 1 namely consists in the fact that additional processing apparatus 3 can also later, as required, be very easily integrated or incorporated in the installation 1, and extensions can thus very easily be carried out.

The installation 1 preferably has a transfer system 4 for transport of the lenses 2 and/or of workpiece carriers or lens carriers 5 with the lenses 2 to and from the processing apparatus 3. The transfer system 4 feeds the lenses 2 or lens carriers 5 (cf. FIG. 2) in particular to the processing apparatus 3 and/or transports or conveys the lenses 2 or lens carriers 5 after a processing has been carried out in a processing apparatus 3 to another processing apparatus 3 or to a handoff 6, as indicated in FIG. 1. The handoff 6 can comprise, for example, a transfer apparatus, a rolling table and/or other storage apparatus or can be formed therefrom.

In addition to the handoff 6, the installation 1 preferably also has an intake 7, which serves to accommodate lenses 2 that are to be processed and/or lens carriers 5 that carry lenses 2 that are to be processed.

In the illustrative example, the handoff 6 is preferably arranged separately from the intake 7, for example on an opposite side. However, the intake 7 and the handoff 6 can, as necessary, also be arranged beside one another or adjacent, as indicated in FIG. 1 by the handoff 6' that is depicted additionally as an alternative beside the intake 7, and/or can be formed by a common apparatus or the like and/or arranged at any points of the transfer system 4.

Preferably, a separate conveying apparatus 8 for in particular linear conveying of at least one lens 2 or one lens carrier 5 is assigned to each processing apparatus 3. In particular, the assigned conveying apparatus 8 is integrated or incorporated into the respective processing apparatus 3 or is attached to the latter. The conveying apparatus 8 is preferably designed as a conveyor belt.

The conveying apparatus 8 of the processing apparatus 3 are preferably controlled each by the respective processing apparatus 3 or the machine control apparatus thereof (not shown in FIG. 1).

Especially preferably, the processing apparatus 3 are designed to be as compact as possible or at least essentially cuboid or to have a rectangular base, wherein the conveying apparatus 8 are arranged in each case preferably behind, i.e., on a side that is opposite from a control console or operating console 17 of the processing apparatus 3, and/or on a narrow side of the respective processing apparatus 3. In principle, however, another arrangement, in particular on a longitudinal side of the respective processing apparatus 3, is also possible.

Especially preferably, the conveying apparatus 8 project laterally over the respective processing apparatus 3 not at all or only slightly and/or to a uniform extent. In particular, the length of the conveying apparatus 8 corresponds at least essentially to the width of the respective processing apparatus 3.

Preferably, the aisle width between adjacent processing apparatus 3 is determined by a transfer apparatus 9 that is arranged in-between said apparatus, which transfer apparatus will be explained later. The aisle width is, for example, approximately 60 cm. An aisle between adjacent processing apparatus 3 is required or desirable in particular for maintenance or repair purposes and/or also for resupplying operating means or the like.

The processing apparatus 3 are preferably arranged or set up beside one another so that the conveying apparatus 8 run at least essentially in a line and/or are behind one another and/or form a first transport track T1 that is at least essentially in a straight line (indicated in dashed-dotted lines in FIG. 1).

It is to be noted that the first transport track T1 and/or a second transport track T2 also correspond(s) to a polygonal line, i.e., is/are built up from various straight-line zones or sections and can run, for example, around corners or in a U shape. In each case, preferably multiple processing apparatus 3 are arranged in a series along these sections in such a way that these processing apparatus 3 are arranged with their conveying apparatus 8 along these zones or this section. This ensures great flexibility in the case of extension of the proposed installation 1, since in particular almost any length extension is made possible, in particular when adding to or expanding the installation 1, in particular by incorporating additional processing apparatus 3 and/or in the case of corresponding expansion of the transfer system 4.

The transfer system 4 preferably has transfer apparatus 9, which in each case are arranged between two adjacent processing apparatus 3 (of a series). Preferably, transfer apparatus 9 are arranged between some or all (directly) adjacent processing apparatus 3.

The transfer apparatus 9 are preferably in each case designed for accommodating—and in particular for temporary intermediate storage of—at least one lens 2 or one lens carrier 5 and/or for further conveying, as necessary, of this lens 2 or this lens carrier 5 selectively to the conveying apparatus 8 of a subsequent processing apparatus 3 or to a second transport track T2 of the installation 1 or the transfer system 4.

The second transport track T2 preferably also runs like the first transport track T1 at least essentially in a straight line or like a polygon and/or parallel to the first transport track T1.

The intake 7 preferably accommodates workpieces or lenses 2 that are to be processed or lens carriers 5 with the lenses 2 that are to be processed. The intake 7 can be designed in particular in such a way that the latter delivers the lenses 2 that are to be processed or the lens carriers 5 selectively to the first or second transport track T1, T2.

The transfer system 4 preferably has multiple conveying apparatus 10, which are arranged in particular in a series or behind one another in order to form the second transport track T2. The lenses 2 or lens carriers 5 can thus be transported or conveyed along this second transport track T2 by means of one or more conveying apparatus 10.

The conveying apparatus 10 of the second transport track T2 can preferably be controlled independently of one another in order to be able to convey lenses 2 or lens carriers 5 independently of one another and/or in sections also along the second transport track T2. For example, a lens 2 or a lens carrier 5 can be halted on a conveying apparatus 10 while another lens 2 or another lens carrier 5 is further conveyed on another conveying apparatus 10 of the second transport track T2.

Based on the preferably segment-like or sectional structure of the second transport track T2 and/or based on the use of independently-controllable conveying apparatus 10 for the second transport track T2, it is also possible that individual conveying apparatus 10 convey opposite to the conveying direction F1 of the first transport track T1, i.e., backwards, while other conveying apparatus 10 of the second transport track T2, for example, halt or continue to convey forward.

Figure 3:
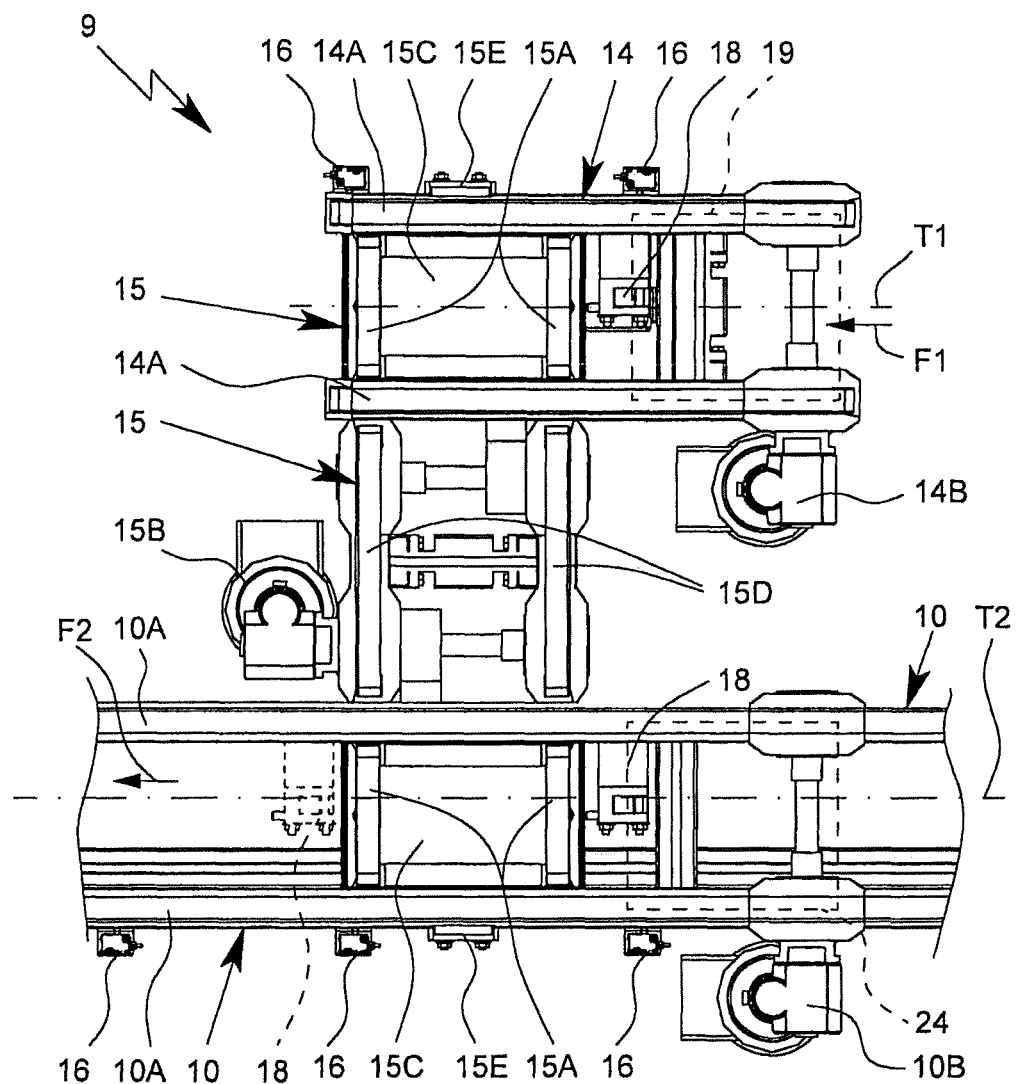
FIG. 3 shows a transfer apparatus of the proposed installation in a sectional enlargement of FIG. 1.

As an alternative or in addition to the different control of conveying apparatus 10 of the second transport track T2 and/or a rearward conveying, a halting of individual lenses 2 or lens carriers 5 can also be carried out by corresponding stopping apparatus or the like (see, for example, stopping apparatus 18 in the transport track T2 in FIG. 3), so that in this case, the conveying apparatus 10 can continue to be operated or can be operated continuously. This preferably applies for some or all transport tracks T and/or conveying apparatus 10.

The transfer apparatus 9 can be arranged, as necessary, between the conveying apparatus 10 of the second transport track T2. However, the transfer apparatus 9 can also alternatively convey directly to an assigned conveying apparatus 10 of the second transport track T2. In this case, the conveying apparatus 10 can be arranged one behind another without insertion of transfer apparatus 9, as indicated in FIGS. 1 and 3.

The conveying direction of the first transport track T1 is indicated in FIG. 1 by an arrow F1. The second transport track T2 preferably conveys in the same direction as indicated by arrow F2.

The second transport track T2 is used in particular in such a way that lenses 2 or lens carriers 5 can be conveyed past individual processing apparatus 3. For example, such a conveying-past can be desirable or necessary for better utilization of processing apparatus 3, for conveying to a specific processing apparatus 3 for special processing, for example based on a failure or a utilization of a processing apparatus 3 or based on unnecessary processing by a processing apparatus 3. As an alternative or in addition, the conveying-past can also serve to overtake other lenses 2 or lens carriers 5, for example when a primary processing of a specific lens 2 or multiple specific lenses 2 is to take place.

Preferably, the lenses 2 or lens carriers 5 can switch between the first and second transport tracks T1, T2 by means of the transfer apparatus 9. In particular, such a switching between any of the processing apparatus 3 and/or by means of any transfer apparatus 9 and/or in any direction, i.e., from the first to the second transport track T1, T2 and vice versa, is possible.

The installation 1 and/or the transfer system 4 preferably has a third transport track T3, which preferably runs at least essentially in a straight line and/or parallel to the other transport tracks T1 and T2.

The conveying direction F3 of the third transport track T3 is preferably directed opposite to the conveying directions F1 and F2 of the other transport tracks T1 and T2 and/or preferably runs backwards. The transport track T3 thus is used in particular in rearward conveying or reverse conveying of lenses 2 or lens carriers 5, for example, for feeding back (via corresponding switching possibilities) into the first or second transport track T1, T2 for a further processing or for rearward conveying, for example to the handoff 6'.

Figure 5:
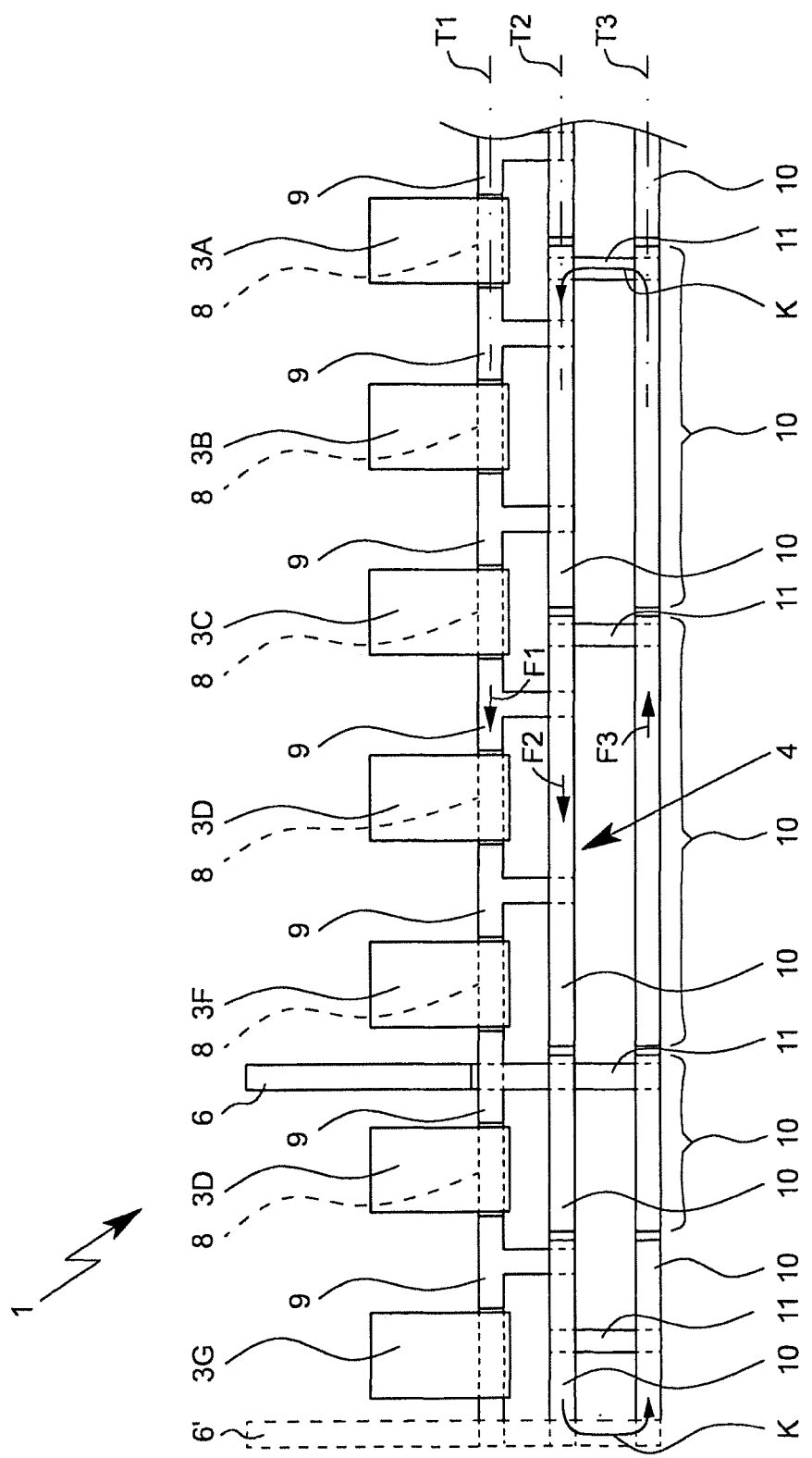
FIG. 5 shows a schematic depiction of the proposed installation according to another embodiment.

The third transport track T3 is preferably built correspondingly or similar to the second transport track T2, especially preferably from multiple conveying apparatus 10 that are arranged in a line or one behind another, as indicated in FIG. 5. The conveying apparatus 10 of the third transport track T3 can preferably again be controlled or driven independently of one another, so that an independent conveying of lenses 2 or lens carriers 5 is possible along the third transport track T3, as was already described above in principle for the second transport track T2, so that these explanations apply in particular correspondingly or in supplementation.

As an alternative or in addition to the different control of conveying apparatus 10 of the third transport track T3 and/or to a rearward conveying, a halting of individual lenses 2 or lens carriers 5 can also be carried out by corresponding stopping apparatus or the like (not shown), so that in this case, the conveying apparatus(es) 10 can continue to be operated and/or can be operated continuously.

The installation 1 and/or the transfer system 4 preferably has switching apparatus 11 for switching between transport tracks T, in particular between the second transport track T2 and the third transport track T3, i.e., selectively from the second transport track T2 to the third transport track T3 and vice versa. The switching apparatus 11 can be arranged in the two transport tracks T2 and T3 in each case between the conveying apparatus 10. In this case, the switching apparatus 11 are also used in a specific further conveying in the direction of the respective conveying direction F2 or F3, i.e., the longitudinal conveying. As an alternative, the switching apparatus 11 can also, however, be integrated into assigned conveying apparatus 10 or can act together with the latter in such a way that the switching directions 11 are used only in the crosswise conveying, i.e., only the conveying between the respective transport tracks T2 and T3. This type of integration is preferred and shown in the illustrative example.

In the illustrative example, the transfer apparatus 9 are preferably integrated correspondingly in the second transport track T2 or in the assigned conveying apparatus 10 of the second transport track T2. In other words, in the illustrative example, the transfer apparatus 9 preferably do not produce any longitudinal conveying or further conveying in the second transport track T2 in the conveying direction F2.

The switching apparatus 11 and the transfer apparatus 9 can also be combined and/or arranged in extension and/or form a subassembly, as indicated by way of example in FIG. 1 in the area of the handoff 6.

As an alternative, all or individual transfer apparatus 9 or switching apparatus 11 can also be designed in such a way that they additionally make possible a selective crosswise conveying up to the optional transport track T3 and/or a switching, as necessary, between all transport tracks T1 to T3 or between the transport tracks T1 and T3.

The installation 1 preferably has an assigned transfer apparatus 9 and/or switching apparatus 11 in the area of one end or the handoff 6, in particular when the latter is physically separated from the intake station 7, as indicated in FIG. 1.

Figure 6:
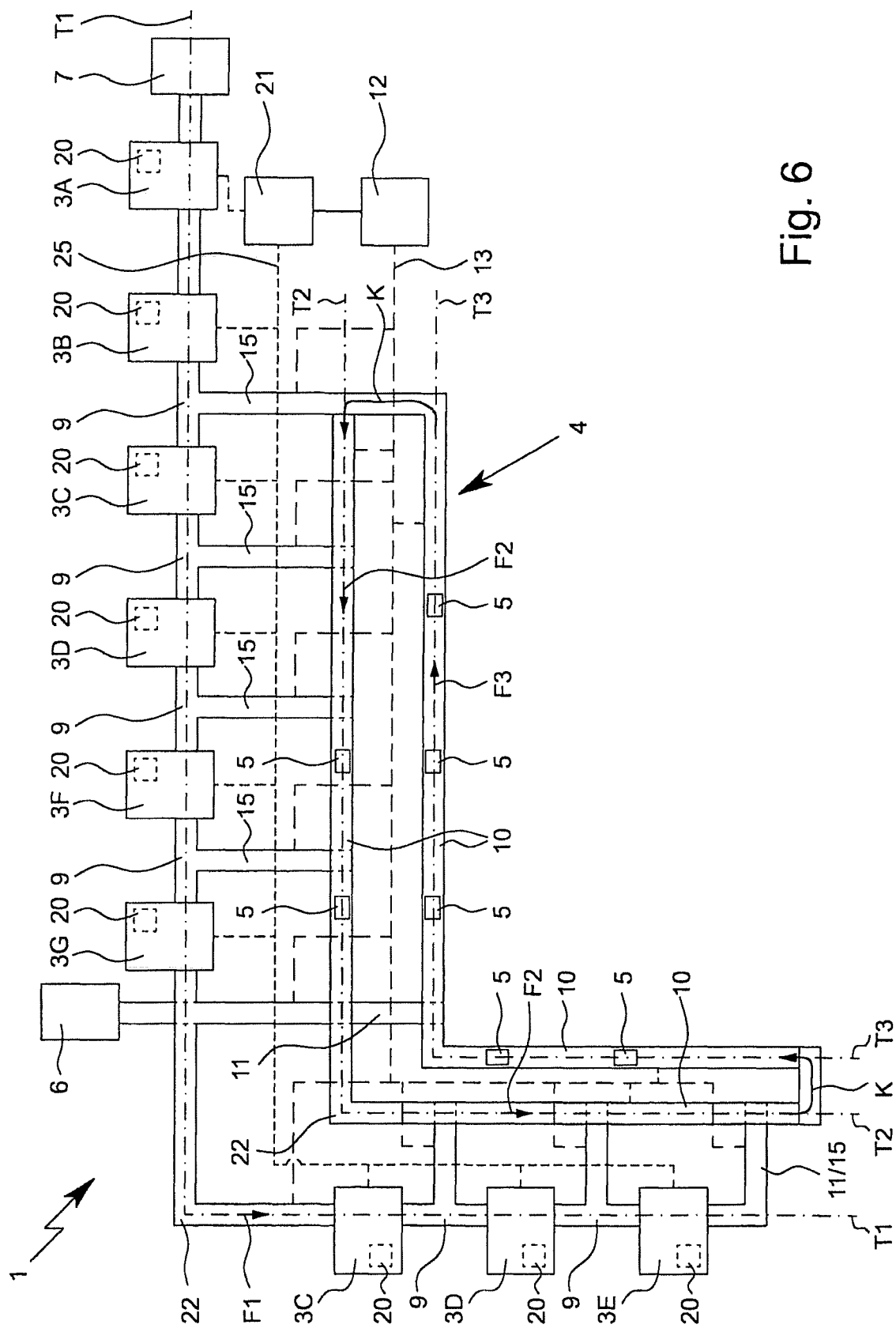
FIG. 6 shows a schematic depiction of the proposed installation according to a further embodiment.
Figure 7:
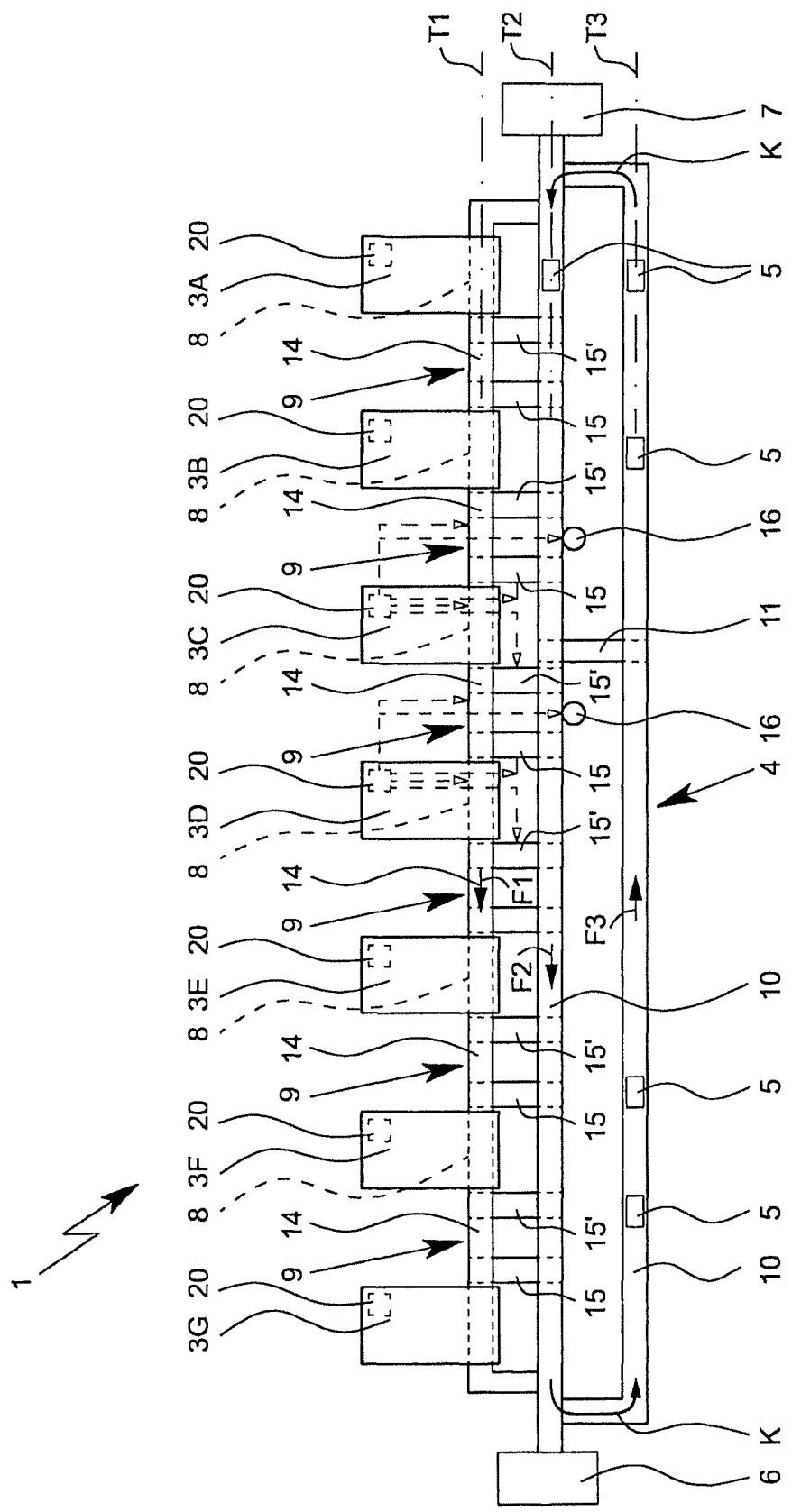
FIG. 7 shows a schematic depiction of the proposed installation according to a another embodiment.

Preferably, switching apparatus 11 are arranged in the area of the beginning and the end of the second or third transport track T2, T3 and/or one or more are arranged in between, in particular to make possible a circuit or circulation or circular conveying K of lenses 2 or lens carriers 5, as indicated in FIGS. 5, 6 and 7.

The installation 1 and/or the transfer system 4 preferably has a transfer control or control apparatus 12—in particular a memory-programmable control apparatus or HMI (human-machine interface)—for controlling the transfer apparatus 9 and/or conveying apparatus 10 as well as, if present, the switching apparatus 11 and optionally the intake 7 and/or handoff 6, as indicated in FIG. 1. The connection is especially preferably made via a bus system 13, which is indicated by dotted lines in FIG. 1. In particular, the power supply and/or control is carried out via the bus system 13. Especially preferably, the bus system 13 has a bus cable that contains all supply lines and/or control lines.

In the case of an extension of the installation 1, additional components, such as transfer apparatus 9, conveying apparatus 10 or switching apparatus 11, can be easily connected directly to the bus system 13 or bus cable. Accordingly, an expansion of the installation 1 or the transfer system 4, if necessary also a remodeling, is very easily possible.

A common or central control of the transfer system 4 is preferably thus carried out. The conveying apparatus 8 that are assigned to the processing apparatus 3 preferably do not form any part of the transfer system 4 or the transfer control, however. Instead of this, the conveying apparatus 8 of the processing apparatus 3 are preferably controlled by the processing apparatus 3 themselves or directly, or by their machine controls (cf. machine control 20 in FIGS. 6 and 7). The conveying apparatus 8 are accordingly preferably connected in each case to the assigned processing apparatus 3 or the machine control 20 thereof for controlling the respective conveying apparatus 8.

Figure 2:
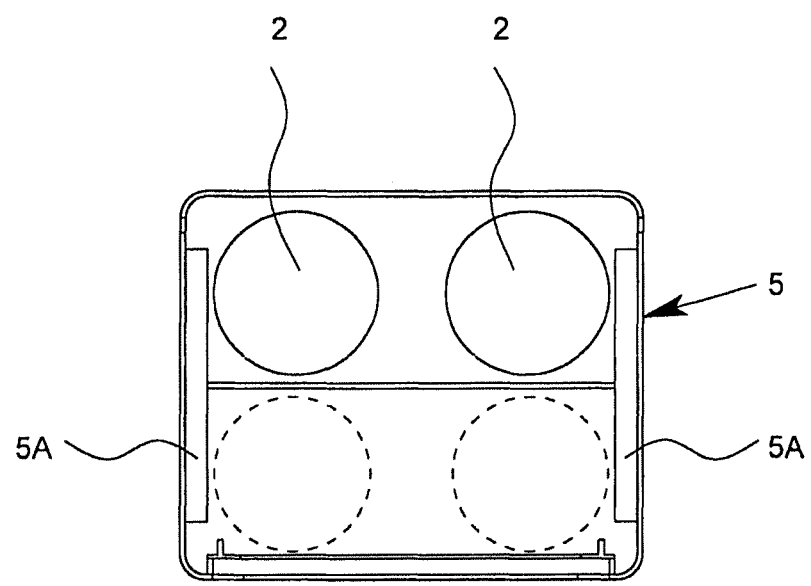
FIG. 2 shows a schematic depiction of a lens carrier with lenses that are to be processed.

In a schematic top view, FIG. 2 shows a preferred embodiment of a lens carrier 5 for accommodating at least one, in the illustrative example in particular two or more, of the lenses 2 that are to be processed. In the case of the lens processing or eyeglass-lens processing, usually two lenses 2 that are to be processed or one pair of lenses are accommodated by a lens carrier 5. This is also preferred here.

The lens carrier 5 preferably has a coding 5A, for example a bar code or the like, with important processing data, data for identification and/or other information for both lenses 2 or a separate coding 5A for each lens 2, as indicated in FIG. 2. The coding 5A especially preferably contains an identification or a job number or the like for the respective lens(es) 2, so that by means of the identification or job number, a processing plan and/or processing status and/or required processing steps, processing sequences, processing data and/or other information can be determined or retrieved therefrom, for example via a corresponding server system, database system or the like, in particular a system control 21, as indicated in FIG. 1.

Preferably, the distance between the lenses 2 in a lens carrier 5 is just as large as the distance from a lens 2 in a lens carrier 5 to the adjacent lens 2 in a directly-adjacent lens carrier 5. This simplifies the handling and/or positioning, in particular in the processing apparatus 3. In the illustrative example, this distance is preferably 130 mm. The length of the lens carrier 5 is preferably double, i.e., 260 mm here.

In the illustrative example, the lens carrier 5 is preferably box-like and/or designed at least essentially square in top view.

In the illustrative example, the lens carrier 5 preferably has additional storage spaces or receiving spaces, for example for tools, in particular polishing tools, as indicated in dotted lines in FIG. 2.

Instead of the lens carrier 5 that is described here, however, another holder can also be used for a lens 2 or multiple lenses 2.

In general, it is to be noted that even a block-piece-free processing can be carried out. In the illustrative example, however, the respective lens 2 is preferably or at least currently still temporarily connected to an assigned holder or block piece (not shown), in particular in the processing apparatus 3A. By means of this holder or block piece, the respective lens 2 is then preferably held and/or positioned in each case in the further processing and/or in other processing apparatus 3.

In a schematic depiction or enlargement of FIG. 1, FIG. 3 shows a preferred structure of a proposed transfer apparatus 9. The transfer apparatus 9 preferably has a (first) conveying apparatus 14 for longitudinal conveying (conveying in the direction F of one of the transport tracks T, in particular the first transport track T1) and a (second) conveying apparatus 15 for crosswise conveying (conveying crosswise or perpendicular to the conveying directions F or transport tracks T or for the transport track switching).

The conveying apparatus 14 and 15 are preferably designed just like the conveying apparatus 8 and/or 10 as band or belt conveyors. In the illustrative example, the conveying apparatus 10 preferably have bands or belts 10A and assigned drives 10B. The conveying apparatus 14 preferably have each bands or belts 14A and assigned drives 14B. The conveying apparatus 15 preferably have bands or belts 15A and assigned drives 15B.

By means of the bands or belts 10A, 14A, 15A that can be driven by the assigned drive 10B, 14B or 15B, lenses 2 or lens carriers 5 that rest thereupon can be conveyed in a linear manner in the respective conveying direction F or crosswise thereto in the case of crosswise conveying.

The transfer apparatus 9 is preferably designed for accommodating and temporarily retaining or storing at least one lens 2 or one lens carrier 5 and in this connection has in particular a storage or intake area 19, as indicated in dotted lines in FIG. 3. In the illustrative example, this or the latter is formed preferably by the conveying apparatus 14, which has a length that is sufficient for this purpose. In particular, the length of the conveying apparatus 14 is at least the single length of a lens carrier 5, in the illustrative example even at least double the length of the lens carrier 5, in order to be able to accommodate or intermediately store the latter, preferably beside or in the conveying direction F1 before or upstream from the conveying apparatus 15 for crosswise conveying or the lifting table thereof 15C. To this end, preferably an appropriate stopping apparatus 18 (for example with a stop or a separator that can be moved or folded into the direction of travel) is assigned to the intake area 19 to halt, as necessary, the or a lens carrier 5 in the intake area 19. The stopping apparatus 18 can halt or stop a lens carrier 5—here in the intake area 19—in particular even in the case of a conveying apparatus 14 that continues to convey.

In this connection, it is to be noted that preferably in general, a stopping or halting of the lens carrier 5 is carried out by means of corresponding or similar stopping apparatus 18 (as depicted by way of example in the second transport track T2 in FIG. 3) at the desired spots or positions of the transfer system 4 and/or the conveying apparatus 8, in order to be able to halt the lens carrier 5 individually or precisely, if required also in the case of continuing conveying apparatus 8, 10, 14 and/or if required 15, or bands or belts.

Preferably, the installation 1 and/or the transfer system 4 or the respective conveying apparatus 8, 10, 14, 15, transfer apparatus 9 and/or switching apparatus 11—in particular in addition to the stopping apparatus 18 or the above-mentioned stopping apparatus, which are not shown—has appropriate sensors 16, such as light barriers, barcode readers, or the like, in particular to detect the presence of lenses 2 or lens carriers 5 and/or their positions and/or to position the lens carriers 5 correctly and/or to be able to detect or identify the lenses 2 or lens carriers 5, especially preferably to be able to read codings 5A.

In the illustrative example, the length of the conveying apparatus 14 or the transfer apparatus 9 in the conveying direction F1 corresponds at least essentially to the distance between adjacent processing apparatus 3 or adjacent conveying apparatus 8 or the aisle width between adjacent processing apparatus 3, as already mentioned, or at least the length of two lens carriers 5.

It is noted that the processing apparatus 3 are preferably in general set up at least at essentially the same intermediate distance. Accordingly, preferably identical transfer apparatus 9 can be inserted or arranged in-between.

As indicated in FIG. 3, in the case of the transfer apparatus 9 according to the illustrative example, the conveying apparatus 15 for crosswise conveying, preferably has an intermediate conveyor with bands or belts 15D between the two transport tracks T1 and T2 or between the conveying apparatus 14 and the adjacent conveying apparatus 10.

The conveying apparatus 15 preferably has a common drive 15B for driving the bands or belts 15A and, if present, 15D.

The bands or belts 15A are preferably arranged in pairs between the belts 14A of the conveying apparatus 14 and the belts 10A of the conveying apparatus 10 and are each preferably carried by a lifting element, in particular a lifting table 15C. The lifting element or the lifting table 15C or the lifting elements/lifting tables 15C and thus the assigned bands or belts 15A preferably can be raised and lowered, as necessary, by means of an assigned lifting apparatus (not shown).

During operation, the conveying apparatus 14 can receive a lens carrier 5 from an upstream processing apparatus 3 and temporarily store or retain it, in particular in the intake area 19 and/or via the lifting table 15C or via the bands and/or belts 15A. As necessary, the transfer apparatus 9 or the conveying apparatus 14 thereof can further convey or hand off the lens carriers 5 to the downstream processing apparatus 3. As an alternative, the transfer apparatus 9 or the conveying apparatus 15 thereof can switch the lens carrier 5 to the transport track T2, i.e., convey it crosswise. In this case, the lifting table 15C is raised until the lens carrier 5 (not shown in FIG. 3) is raised and is lifted away from the bands or belts 14A of the conveying apparatus 14. Then, the lens carrier 5 is conveyed by means of the bands or belts 15A—in the illustrative example via the optional intermediate conveyors or the bands or belts 15D—to the second transport track T2 or to the bands or belts 15A located there. Preferably, for the crosswise conveying, the lifting table 15C in the transport track T2 or in the conveying apparatus 10 is also always raised together or in the same way. A preferred lateral stop 15E, which projects laterally upward over the conveying apparatus 10 or the bands or belts 10A thereof, prevents the lens carrier 5 from being conveyed too far in the crosswise direction or the lens carrier 5 from being conveyed laterally over the conveying apparatus 10.

Then, the conveying apparatus 15 or the lifting tables 15C thereof is/are again lowered, and thus the lens carrier 5 is transferred to the conveying apparatus 10 or laid down on the bands or belts 10A thereof, so that now a conveying can be carried out along the second transport track T2 by means of the conveying apparatus 10.

In the illustrative example, the conveying apparatus 15 for crosswise conveying is integrated into the conveying apparatus 10 for longitudinal conveying, since no separate conveying apparatus is provided for the longitudinal conveying of the transfer apparatus 9 in the second transport track T2, in contrast to the conveying apparatus 14 for longitudinal conveying of the transfer apparatus 9 in the first transport track T1. However, in principle, such an additional conveying apparatus 14 of the transfer apparatus 9 can also be provided in the second transport track T2.

The transfer apparatus 9 can be used not only for a switching of the lens carrier 5 from the first transport track T1 to the second transport track T2, but rather, of course, also for the reversed switching, in particular for feeding a lens 2 or a lens carrier 5 into the transport track T1 for the processing in a subsequent processing apparatus 3. In this case, the lens carrier 5 is positioned by the second transport track T2 or the assigned conveying apparatus 10 above the conveying apparatus 15 for crosswise conveying, or the lifting table 15C thereof in the second transport track T2. The positioning is done preferably by means of a stopping apparatus 18, for example by means of the stopping apparatus 18 that is depicted in dotted lines, which apparatus is arranged in particular in the second transport track T2 or after the lifting table 15C.

Then, the raising of the transport tables 15C and then the crosswise conveying to the transport track T1 can be carried out by corresponding driving of the bands or belts 15A and 15D by means of the drive 15B, until the lens carrier 5 is positioned on the conveying apparatus 14, wherein the intake area 19 can also be covered by another lens carrier 5, since the intake area 19 is arranged preferably beside or in particular before or upstream from the conveying apparatus 15. The positioning of the crosswise-conveyed lens carrier 5 in the transport track T1 can in turn be facilitated or determined by an optional lateral stop 15E.

The transfer apparatus 9 is used preferably both for a feeding of lenses 2 or lens carriers 5 into the first transport track T1 and a discharging of lenses 2 or lens carriers 5 from the transport track T1 into another transport track, here the second transport track T2.

The transfer apparatus 9 is in particular designed in such a way that a lens 2 or a lens carrier 5 can be conveyed crosswise and/or can be fed into the first transport track T1, while another lens 2 or another lens carrier 5 is located in the intake area 19 or intermediately retained there or intermediately stored there. Thus, lenses 2 or lens carriers 5 can also be fed between other lenses 2 or lens carriers 5 in the first transport track T1.

The transfer apparatus 9 further makes possible, as already mentioned, a selective further conveying of a lens 2 or a lens carrier 5 from the preceding processing apparatus 3 (in the first transport track T1) and/or from the intake area 19 to the next processing apparatus 3 as well as a discharging or crosswise conveying from the first transport track T1 to another transport track T, here the second transport track T2. In particular, the transfer apparatus 9 thus forms a track switch, with in particular upstream intake area 19 for intermediate storage.

Since the transfer apparatus 9 preferably also is designed for the already-mentioned feeding of lenses 2 or lens carriers 5 into the first transport track T1, the transfer apparatus 9 forms in particular a universally usable track switch, which starting from the first conveying direction F1 makes possible a branching to crosswise conveying for discharging as well as a feeding in particular via the same crosswise conveying with reverse direction and for further conveying in the first conveying direction F1. Thus, a very compact structure with universal usability is made possible.

It is also to be noted that the transfer system 4 or the second transport track T2 preferably makes possible a halting of lenses 2 or lens carriers 5 before the crosswise conveying of the transfer apparatus 9, in particular for feeding into the second transport track T2, for example in each case in an upstream stopping area 24, as indicated in dotted lines in FIG. 3, in particular by means of an assigned stopping apparatus 18 or the like, so that an undisturbed feeding of lenses 2 or lens carriers 5 into the second transport track T2 can be carried out.

Preferably, a sensor 16 for detecting or identifying lenses 2 or lens carriers 5 in the stopping area 24 is assigned to the stopping area 24.

Preferably, sensors 16 are also assigned to the lifting tables 15C or arranged in the area of the conveying apparatus 15 of the first and/or second transport track T1 or T2, respectively, in order to be able to detect or to identify lenses 2 or lens carriers 5 there.

Preferably, at least one sensor 16, which is assigned to a transfer apparatus 9 and/or to the intake area 19 and/or to the stopping area 24, is assigned to the downstream processing apparatus 3, so that via this sensor 16 or these sensors 16, incoming lenses 2 or lens carriers 5 can be detected and preferably identified in order to be able to detect and as necessary to request lenses 2 that are suitable for the processing in the assigned processing apparatus 3—in particular with reference to—or taking into consideration—the processing plan and processing status of the respective lens 2.

Figure 4:
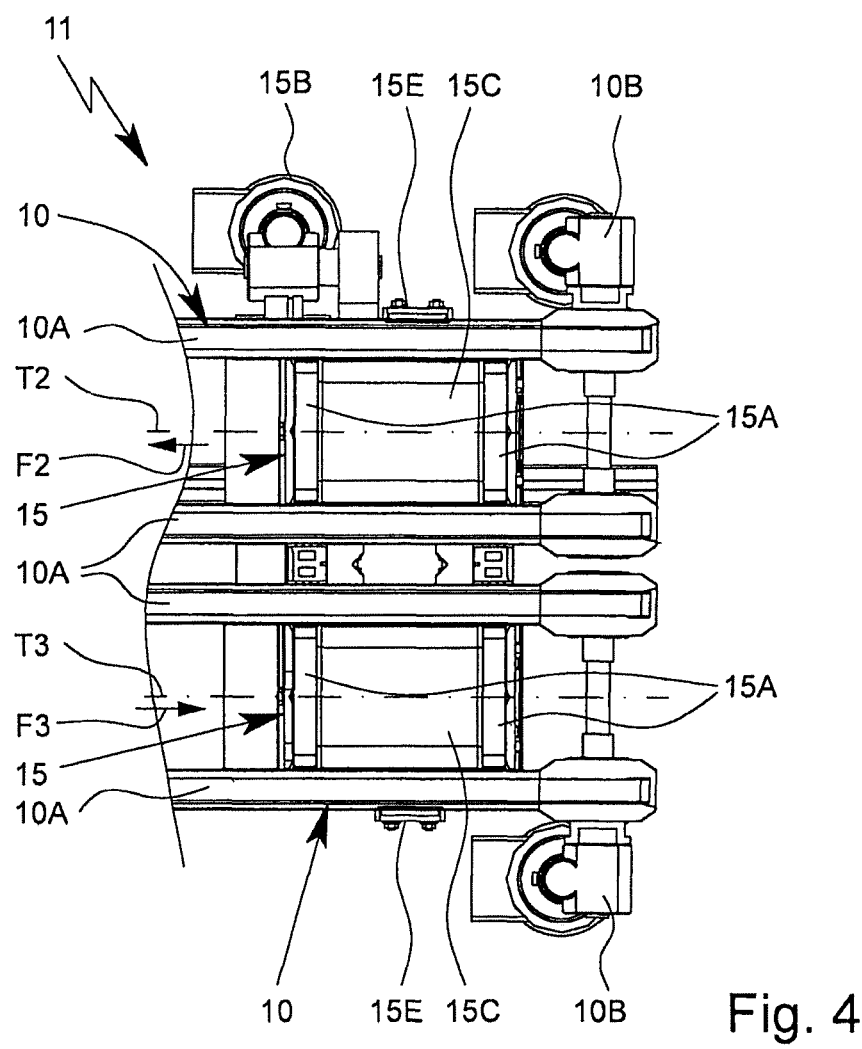
FIG. 4 shows a switching apparatus of the proposed installation for switching between transport tracks in a sectional enlargement of FIG. 1.

In a schematic, enlarged view of FIG. 1, FIG. 4 shows a preferred structure of a switching apparatus 11. The switching apparatus 11 preferably has a conveying apparatus 15 for crosswise conveying similar to the conveying apparatus 15 of the transfer apparatus 9, so that reference is made to the relevant explanations. Unlike the conveying apparatus 15 of the transfer apparatus 9, the conveying apparatus 15 of the switching apparatus 11 preferably has no intermediate conveyor or a very scaled-down intermediate conveyor, in particular since the two transport tracks T2 and T3 preferably lie very closely beside one another or (much) closer than the transport tracks T1 and T2; thus, the intermediate distance is preferably smaller. In the case of the switching apparatus 11, the drive 15B of the conveying apparatus 15 is therefore preferably not arranged between the assigned transport tracks T2 and T3, but rather preferably laterally, in particular at the transport track T2 toward the transport track T1.

For the sake of simplification, lifting apparatus for the lifting tables 15C are not shown in FIG. 4. However, the lifting elements or lifting tables 15C and thus the bands or belts 15A of the conveying apparatus 15 can be lifted and lowered in the case of the switching apparatus 11 preferably in a corresponding way, as is the case with the transfer apparatus 9, so that reference is made to this description.

The conveying direction of the crosswise conveying by the conveying apparatus 15 can preferably be changed in the case of the switching apparatus 11 just like in the case of the transfer apparatus 9, thus the drive 15B can operate in different directions in order to be able to switch or to convey lens carriers 5 selectively or as necessary from the second transport track T2 to the third transport track T3 or vice versa.

As already mentioned, a switching apparatus 11 and a transfer apparatus 9 or their conveying apparatus 15 for crosswise conveying can also be combined with one another or can form a subassembly or be arranged in extension to one another. In this case, a lifting table 15C can be omitted.

Further, the transfer apparatus 9 can then make possible a switching over the second or middle transport track T2 into the third transport track T3, or form a switching apparatus.

In the illustrative example, the distance between the first and second transport tracks T1 and T2 is preferably greater than the distance between the second and third transport tracks T2 and T3. In this connection, it can be taken account of the space requirement of the processing apparatus 3 for the intake and laying down of lenses 2 on the respective conveying apparatus 8 or a lens carrier 5 that is arranged thereon. In particular, the processing apparatus 3 arch over or enclose namely the respectively assigned conveying apparatus 8 at least partially, as schematically indicated in the illustrative examples according to FIG. 1 and FIG. 5.

Preferably, storage apparatus or tanks or the like for the processing apparatus 3 can also be arranged under the transport tracks T and/or conveying apparatus 10 and/or transfer apparatus 9.

The installation 1 or the processing apparatus 3 form(s) preferably a processing line B, in particular together with the transfer system 4, in order to process the workpieces or lenses 2. The processing line B that is depicted by way of example in FIG. 1 runs here in particular in a straight line, but can also have any other arrangement, in particular depending on the forming of the transport tracks T or configuration of the transfer system 4. In particular, for example, an arrangement with corners, as indicated in FIG. 6, is possible.

The installation 1 preferably has the central installation or system control 21. Preferably, individual, multiple or all processing apparatus 3 or machine controls 20 thereof are connected to the latter, for example via a data network, an (additional) bus system 25, Ethernet wiring or the like. Preferably, the transfer system 4 or control apparatus 12 is or are connected—in particular via the bus system 13 and/or the sensors 16 or the like—to the system control 21, as indicated in FIG. 1.

Below, based on the additional figures, first other embodiments of the proposed installation 1 are explained. In this connection, in particular significant differences and new aspects are discussed in more detail in each case, so that the previous remarks and explanations apply in particular correspondingly or in supplementation, even when this repetition is omitted.

In a schematic depiction, FIG. 5 shows another embodiment of the proposed installation 1. FIG. 5 illustrates that the proposed installation 1 can very easily be expanded—i.e., extended—by integration or incorporation of additional processing apparatus 3. For example, additional processing apparatus 3—here, by way of example, another processing apparatus 3D for polishing and an additional processing apparatus 3G for coating—were incorporated here later into a processing line or manufacturing line that ended with the output station 6 (on the left thereof in FIG. 5). The transfer system 4 was correspondingly extended or expanded. The handoff 6 can then, if necessary, also be remodeled and arranged, for example, at the end, as indicated in dotted lines by position 6'.

The proposed installation 1 makes possible an optimized processing and use of the often varying processing capacities of the various processing apparatus 3. For example, lenses 2 or lens carriers 5 with lenses 2 can selectively be conveyed to the original processing apparatus 3D on the right side or to the further processing apparatus 3D on the left side, wherein a forward conveying via the second transport track T2, and, if necessary, a rearward conveying in particular via the third transport track T3, for example for subsequent processing in the right processing apparatus 3F, can be carried out.

According to an especially preferred aspect of this invention, circulation or circular conveying K of the lenses 2 or lens carriers 5 via the second transport track T2 in one direction and the third transport track T3 in the reverse direction can be carried out. In particular, circulation or circular conveying K of the lenses 2 or lens carriers 5 is made possible or formed by corresponding crosswise connections or crosswise conveying between the two transport tracks T2 and T3. This can make possible in particular a storage of lenses 2 or lens carriers 5 and/or can prevent or minimize the formation of undesirable blockages. In particular, the lenses 2 or lens carriers 5 are—depending on necessity and/or availability—discharged or conveyed to desired processing apparatus 3. This is carried out in particular by corresponding crosswise conveying and/or a switching to the first transport track T1 or to a transfer apparatus 9 that is assigned to or arranged upstream of the desired processing apparatus 3.

Corresponding circulation or circular conveying K of lenses 2 or lens carriers 5 is preferably also possible or provided in the case of the proposed installation 1 according to the additional embodiment shown in FIG. 6 or according to the proposed method.

In FIG. 6, it is schematically indicated that in the case of the circulation or circular conveying K, multiple lens carriers 5 circulate or are conveyed in a circuit, for example until the next processing apparatus 3 or a desired processing apparatus 3 is ready for receiving or conveying for the appropriate processing.

In the case of the embodiment that is shown in FIG. 6, an original installation 1, built up at least essentially in a straight line, was expanded or extended, wherein the extension portion runs preferably angled. The installation 1 and the transport tracks T thus have in particular an L shape here. As already mentioned, however, other in particular polygonal arrangements—or just an arrangement that is at least essentially only in a straight line or other arrangements—are also possible, in particular depending on structural circumstances. In the illustrative example, the original installation 1 with the original processing apparatus 3A, 3B, 3C, 3D, 3F and 3G (in FIG. 6 above) was, for example, expanded or extended by additional processing apparatus 3C, 3D and 3E (on the left side in FIG. 6).

The extension of the transfer system 4 is carried out in the illustrative example preferably via connecting apparatus 22, in particular corresponding extensions, deflections, corner connectors and/or the like, especially preferably to connect additional conveying apparatus 10 and/or transfer apparatus 9 or the like, and/or to extend the first, second and/or third transport track T. Especially preferably, the transport tracks T2 and T3 and/or the possible or preferred circular conveying K is/are correspondingly extended. In the illustrative example, the circular conveying K and the transport tracks T originally ended in the area of the handoff 6. Only the extension has led to the L-shaped structure that is depicted here by way of example.

The required additional transfer apparatus 9 and/or conveying apparatus 10 and/or switching apparatus 11 in the case of the extension of the transfer system 4 are preferably connected directly to the bus system 13. Accordingly, the expense for the expansion can be minimized, i.e., an extension can be carried out very simply.

As already mentioned, an independent control of the transfer system 4, on the one hand, and the conveying apparatus 8 of the processing apparatus 3, on the other hand, is preferably carried out. It is preferably provided that the transfer apparatus 9, conveying apparatus 10 and/or switching apparatus 11 are controlled by the preferably central transfer control apparatus 12, in particular a memory-programmable control, and/or via the bus system 13, and that the conveying apparatus 8 of the processing apparatus 3 are controlled by the respective processing apparatus 3 or the machine control 20 thereof. In particular, the transfer system 4 is controlled overall by the control apparatus 12. This makes possible an optimal process sequence and/or a very robust control that is less susceptible to disturbances. In addition, this facilitates an extension of the installation 1.

In the illustrative example, individual, multiple or all processing apparatus 3 or machine controls 20 thereof are also preferably connected to the central installation or system control 21, for example via a data network, an (additional) bus system 25, Ethernet wiring, or the like.

In the case of the system control 21, this can be a server, a database system, or the like.

The system control 21 manages in particular the jobs that are to be processed by the installation 1 and/or the lenses 2 that are to be processed by the installation 1 and/or the information that is necessary for the processing, for example processing data, processing plans or processing sequences, processing status, planned or required processing steps, optical and/or geometric information or data of the lenses 2 and/or other information, for example about tools that are available or are to be used, or the like.

Preferably, the transfer control or control apparatus 12, on the one hand, and the system control 21, on the other hand, are coupled to one another for information and/or data exchange, as schematically indicated in FIG. 6.

Preferably, the system control 21 can control the transfer system 4 and/or the transfer apparatus 9, conveying apparatus 10 and/or switching apparatus 11 in particular via the control apparatus 12 in such a way that desired lenses 2 or lens carriers 5 are conveyed to the respective processing apparatus 3, if necessary only upon the corresponding request of the respective processing apparatus 3.

In particular, various or all processing apparatus 3 can request or fetch individual work orders or lenses 2 that are to be processed or lens carriers 5 with lenses 2 to be processed automatically from the transfer system 4, can perform the respective required processing, and after the processing can feed the lens 2 back again to the transfer system 4 or can deliver the lens to the transfer system 4.

The fetching or requesting of lenses 2 for processing by one, multiple or if required all processing apparatus 3 is thus preferably carried out automatically and/or independently. In particular, a processing apparatus 3 can automatically determine—in particular taking into consideration a processing plan and processing status (these processing data or this information is/are queried or provided in particular by the system control 21 or a database, a data storage unit, or the like)—whether a lens 2 (in particular located near or just before the processing apparatus 3) is suitable for processing in the respective processing apparatus 3 in order to be able to request said lens or the corresponding lens carrier 5 or to let said lens or lens carrier be conveyed to itself in the case of corresponding capacity of the processing apparatus 3.

In particular, multiple processing apparatus 3 can thus select and/or request—for the same processing, independently of one another—a lens 2 for the next processing. In the illustrative example, the request is made by a processing apparatus 3 in particular when the load has been removed from the latter. If necessary, the request can also already be made in advance, however, for minimizing the waiting period. Then, in the meantime, the next lens 2 that is to be processed or the corresponding lens carrier 5 can in particular already be conveyed to the transfer apparatus 9 that is upstream from the processing apparatus 3 or can be accommodated by said transfer apparatus and held there until the processing apparatus 3 is ready to receive the next lens 2 or the next lens carrier 5.

Preferably, the respective processing apparatus 3 delivers a corresponding piece of information or a corresponding signal to the control apparatus 12 when a lens 2 or a lens carrier 5 is to be handed off or was already handed off after the processing to the downstream transfer apparatus 9 or to the transfer system 4. Depending on the capacity, the respective lens 2 or the respective lens carrier 5 is then accommodated by the transfer system 4 or the transfer apparatus 9 that is downstream from the respective processing apparatus 3, for example in the intake area 19, and/or further conveyed, for example to a downstream processing apparatus 3 and/or fed back into the second transport track T2 or the circular conveying K. This can selectively be carried out by the transfer system 4 or the control apparatus 12 thereof automatically and/or in coordination with and/or depending on the system control 21.

In addition, a lens 2 or a lens carrier 5 is then again conveyed to the processing apparatus 3 that is ready for receiving a lens 2 or a lens carrier 5, wherein the selection— as already mentioned—is carried out especially preferably by the respective processing apparatus 3 or the machine control 20 thereof and/or by the system control 21, especially preferably taking into consideration data that is relevant for the processing, such as processing plan and processing state, in particular from the system control 21. The control of the conveying is then preferably carried out via the control apparatus 12, but it can, if necessary, also be controlled by the respective processing apparatus 3 or the machine control 20 thereof, as is explained in more detail later based on another embodiment according to FIG. 7.

As an alternative or in addition, when lenses 2 or lens carriers 5 are fed and removed or in the case of the control of the upstream and/or downstream transfer apparatus 9 and/or conveying apparatus 14, the respective processing apparatus 3 can take precedence, for example, over a downstream or upstream processing apparatus 3 and/or over the transfer control or control apparatus 12.

Especially preferably, after the processing, a processing apparatus 3 or the conveying apparatus 8 thereof delivers a lens 2 or a lens carrier 5 to the transfer system 4 or to a transfer apparatus 9—preferably downstream in the conveying direction F1—if or as soon as space for accommodation is available, in particular when the respective or assigned intake area 19 is free. To this end, the processing apparatus 3 or the machine control 20 thereof preferably communicates via the system control 21 or directly to the transfer control or control apparatus 12 or to the transfer system 4 or the respective transfer apparatus 9.

After the processing apparatus 3 or the conveying apparatus 8 thereof is freed up, it can accommodate the next lens 2 or the next lens carrier 5 again. The conveying is done in particular via the transfer system 4 or the upstream transfer apparatus 9. The initiation of the conveying is done preferably by a request of the respective processing apparatus 3 or by the system control 21 when the latter has recognized or when it has been communicated, that the processing apparatus 3 or the conveying apparatus 8 thereof has been freed up.

It is to be noted that the conveying apparatus 8 of the processing apparatus 3 can accommodate if necessary (simultaneously) in particular also multiple lenses 2 or lens carriers 5 with lenses 2. The term "freed up" is then correspondingly defined to the extent that the respective processing apparatus 3 or the conveying apparatus 8 thereof is ready to accommodate a lens 2 or a lens carrier 5, even when there are still one or more lenses 2 or lens carriers 5 in the processing apparatus 3 or the conveying apparatus 8 thereof.

As already mentioned, in the illustrative example, the conveying can be done in particular selectively from the intake area 19 of an upstream transfer apparatus 9 or by crosswise conveying via the conveying apparatus 15 and subsequent longitudinal conveying via the conveying apparatus 14 of the upstream transfer apparatus 9, thus by conveying from the second transport track T2.

The control apparatus 12 and/or the request of the respective processing apparatus 3 and/or a prioritization of processing or lenses 2 by the system control 21 preferably controls the process sequence and/or the conveying.

The lens 2 that was already processed prior to this by the processing apparatus 3 or the lens carrier 5 that carries the latter can be accommodated by the downstream transfer apparatus 9 and, if necessary, can be intermediately stored in the intake area 19. However, further conveying without halting can also be carried out directly, if required.

The further conveying can consist in the fact that the lens 2 or the lens carrier 5 is further conveyed to the next processing apparatus 3, i.e., further along the first transport track T1 in the conveying direction F1, and thus is conveyed to the next processing apparatus 3 or the conveying apparatus 8 thereof. As an alternative, a crosswise conveying can also be carried out by means of the conveying apparatus 15 and a switching into the second transport track T2 and if required further into the third transport track T3. In this way, further conveying to another processing apparatus 3 or, if required, to the handoff 6 can then be carried out.

Further conveying via the second and/or third transport track T2, T3 is preferably carried out when conveying to another processing apparatus 3 is desired or necessary, for example because of a failure of a processing apparatus 3 or of different equipment or different tools of the processing apparatus 3, or, for example, because of a desired or required processing order or a desired or required processing sequence.

In a schematic depiction, FIG. 7 shows yet another embodiment of the proposed installation 1. Preferably, individual, multiple or all transfer apparatus 9—besides the respective conveying apparatus 15 for crosswise conveying—have in addition a conveying apparatus 15' for crosswise conveying. Both conveying apparatus 15 and 15' of a transfer apparatus 9 can be operated preferably independently of one another. This makes it possible that the respective processing apparatus 3 in each case directly and/or automatically controls the upstream crosswise conveying via the upstream conveying apparatus 15 and the downstream crosswise conveying via the downstream conveying apparatus 15', in particular independently of the transfer control or control apparatus 12 that is not shown in FIG. 7. Thus, an automatic discharging of lenses 2 or lens carriers 5 from the circulation or circular conveying K and/or an automatic rearward conveying or feeding back of lenses 2 or lens carriers 5 into the circulation or circular conveying K is made possible by the respective processing apparatus 3 or the machine control 20 thereof. For the processing apparatus 3C and 3D, it is therefore indicated by way of example in FIG. 7 that the respective machine control 20 is connected to the assigned conveying apparatus 15 and 15'.

The conveying apparatus 14 that is assigned or arranged in-between is optionally provided, can thus also be omitted, and is preferably controlled by the upstream or downstream processing apparatus 3 or the machine control 20 thereof.

As an alternative or in addition, a detection of lenses 2 or lens carriers 5 is especially preferably made possible in particular via sensors 16 that are also connected to the machine control 20. By means of the sensors 16, it is possible, for example, to identify lenses 2 or lens carriers 5 that are located in the transport track T2 or circulation or circular conveying K and to discharge lenses 2 or lens carriers 5 that are suitable for the processing in the respective processing apparatus 3 or to be able to switch into the first transport track T2, in particular independently of other processing apparatus 3 or the machine controls 20 thereof and/or independently of the transfer control or control apparatus 12 and/or independently of the system control 21.

The machine controls 20 are assigned preferably to the respective processing apparatus 3 or arranged in the latter, but they can also be separated therefrom or arranged centrally.

Figure 8:
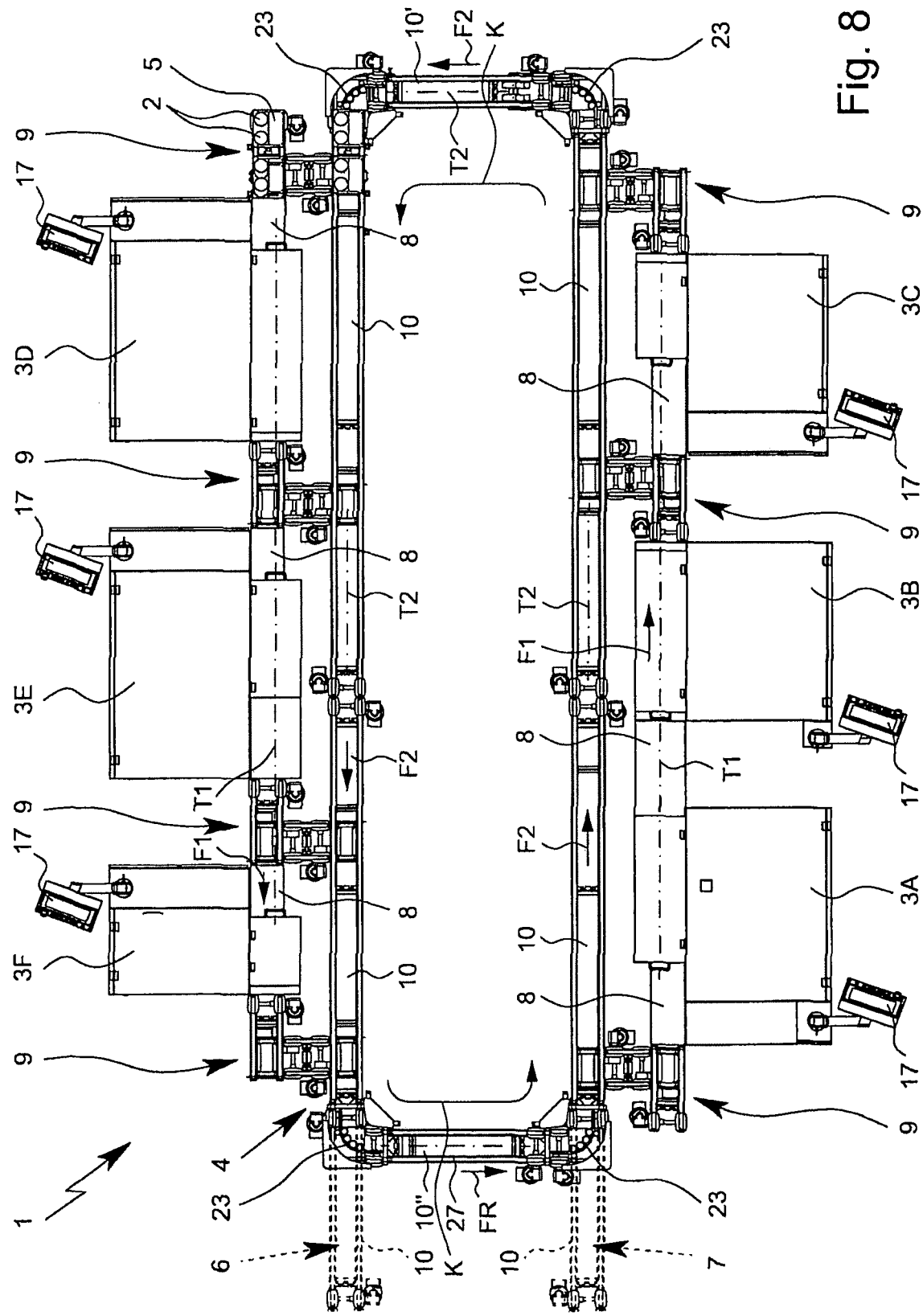
FIG. 8 shows a schematic depiction of the proposed installation according to a still further embodiment.

In a schematic depiction, FIG. 8 shows another embodiment of the proposed installation 1. In this embodiment, preferably an at least essentially U-shaped arrangement, in particular of the first or second transport track T1 or T2, is formed.

Preferably, two groups or series of processing apparatus 3, here, for example, a first group of processing apparatus 3A, 3B and 3C and a second group of processing apparatus 3D, 3E and 3F, are formed or arranged opposite to one another and/or with conveying apparatus 8 arranged on sides facing one another, and/or are arranged in such a way that the assigned transport tracks T1 and/or T2 of the two groups preferably run parallel to one another.

The installation 1 and/or the transfer system 4 preferably has a crosswise connection, which connects the two groups of the processing apparatus 3 via a conveying apparatus 10' and/or 10" crosswise or to one another.

The conveying apparatus 10' preferably forms a leg or portion of the preferably at least essentially U-shaped arrangement or a part of the preferably essentially U-shaped course of the first or second transport track T1 or T2, here the second transport track T2. As required, one or more processing apparatus 3 can also be arranged in this portion.

The installation 1 and/or the transfer system 4 preferably has a rearward conveying connection 27.

The rearward conveying connection 27 preferably has the (second) conveying apparatus 10" or is formed therefrom.

Preferably, in the depicted embodiment, circulation or circular conveying K is possible especially preferably via the first or second transport track T1 or T2. In the embodiment, to this end, the rearward conveying connection 27 is provided for the first or second transport track T1 or T2 (in the illustrative example, only for the second transport track T2). Here, the rearward conveying connection 27 makes possible a rearward conveying in the rearward conveying direction FR, so that the circular conveying K of the lenses 2 or lens carriers 5 is made possible via the second transport track T2 without reversing the conveying direction F2 and without switching to the reverse conveying direction F3.

In the depicted embodiment, the installation 1 and/or the transfer system 4 preferably has an intake 7 and/or handoff 6 and/or corresponding conveying apparatus 10 (indicated in dotted lines on the left side in FIG. 8) as an inflow zone and/or outflow zone for lenses 2 or lens carriers 5.

The rearward conveying connection 27 and/or conveying apparatus 10" is especially preferably arranged in the area of the beginning and/or the end of the transport track T1 or T2 and/or the usual processing and/or in the area of the intake 7 or handoff 6. Especially preferably, the rearward conveying connection R or conveying apparatus 10" is connected via corresponding track switches. However, other constructive solutions and/or arrangements are also possible; in particular, they depend on position and design or arrangement of the intake 7 and/or handoff 6.

In the embodiment according to FIG. 8, the rearward conveying connection 27 makes possible the circular conveying K or circulation of the lenses 2 or lens carriers 5. Accordingly, a third transport track T3 for rearward conveying or circulation is not necessary. However, the rearward conveying connection 27 and the third transport track T3 can, if necessary, also be combined or used in supplementation, in particular according to structural circumstances and/or existing processing apparatus 3.

The rearward conveying connection 27 can, if necessary, also be arranged at another point or form only a circuit for some of the processing apparatus 3, for example can be connected, on the one hand, between the processing apparatus 3B and 3C, and, on the other hand, between the processing apparatus 3D and 3E, as required thus also can form or make possible a shorter or smaller circuit.

If necessary, multiple such crosswise connections and/or rearward conveying connections 27 can also be or are provided. In this way, if necessary, additional storage zones can also be formed.

The installation 1 and/or the transfer system 4 preferably has conveying apparatus 23 for curved conveying, in particular to connect straight sections of the respective transport track, here T2, and/or different conveying apparatus 10, 10' and/or 10" and/or the rearward conveying connection 27 to the transport track T2. It can be achieved by the curved conveying that the orientation of the lenses 2 or lens carriers 5 relative to the respective conveying direction F remains the same, thus, for example, in the case of a lens carrier 5 with two lenses 2, the same lens 2 is always in front.

In the illustrative example, the two groups of processing apparatus 3 or the two legs of the especially preferred U-shaped arrangement are preferably arranged relatively close to one another and/or are spaced in such a way that the intermediate space provides an access for an operator, not shown. In particular, to this end, the crosswise connections and/or conveying apparatus 10' and/or 10" are designed in such a way that they, if necessary, can be released or opened or folded away. As an alternative or in addition, they can also be located higher of lower and, for example, connected via corresponding vertical conveyors or inclined tracks, so that preferably free access to the intermediate space is made possible.

As an alternative or in addition, the intermediate space can also be used for containers for operating means for processing apparatus 3, for example for a coolant container, a container for shavings, a container for refrigerant, or the like. The containers can be arranged in particular in the intermediate space and/or below the transfer system, especially preferably below the second transport track T2.

Figure 9:
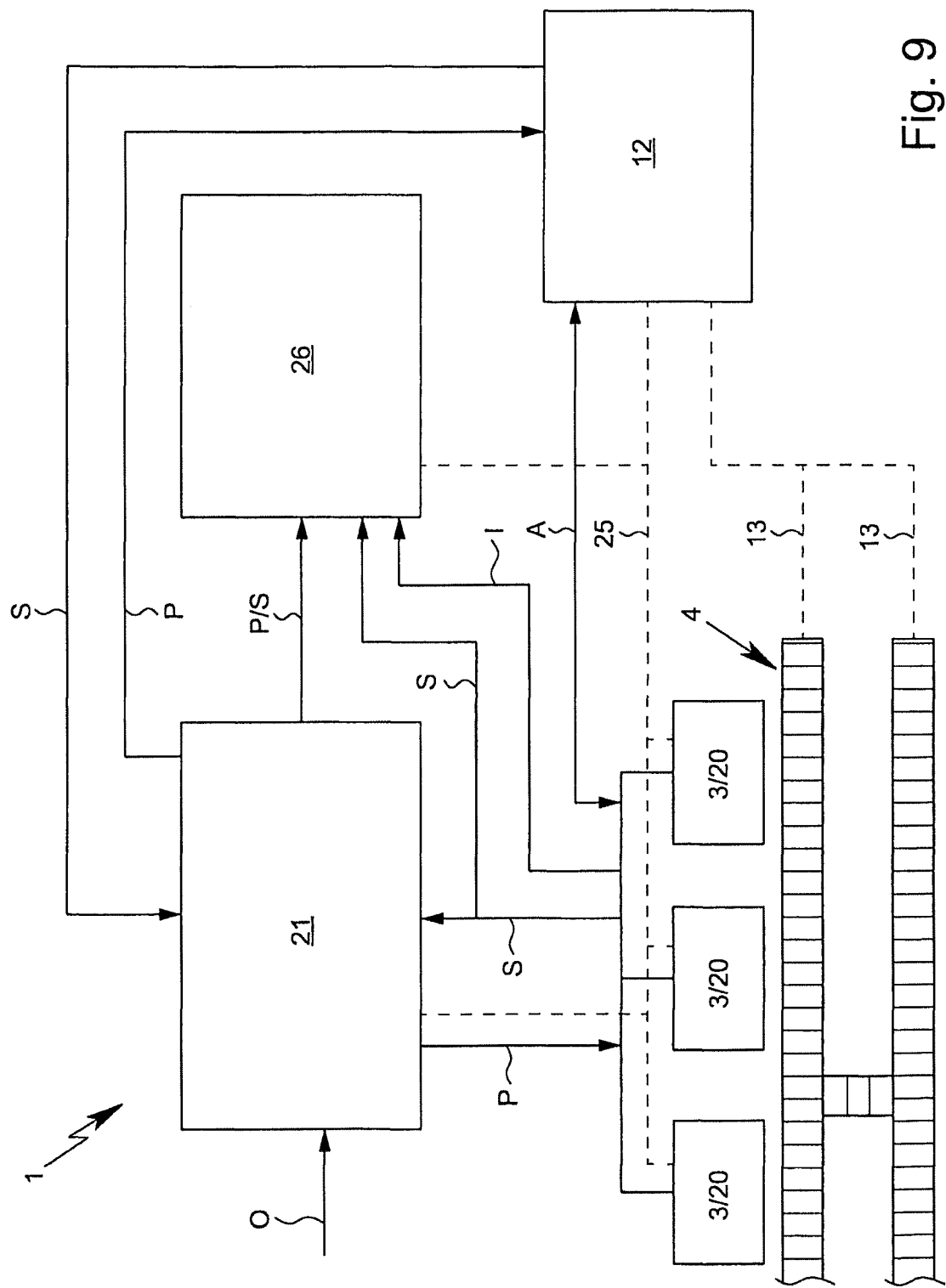
FIG. 9 shows a schematic block diagram of a preferred control structure of a proposed installation.

In a very schematic depiction, FIG. 9 shows a block diagram of a preferred control structure of a proposed installation 1.

As already mentioned, the installation 1 and/or the transfer system 4 preferably has an in particular central transfer or control apparatus 12. In this case, this is in particular a so-called belt main computer. If necessary, this can also be a program and/or multiple crosslinked computers, data processors, control apparatus, or the like.

The transfer or control apparatus 12 is used in particular in the control of the production flow and/or the conveying of lenses 2 or lens carriers 5, such as the circulation or circular conveying K and/or conveying of lenses 2 or lens carriers 5 to the processing apparatus 3 and away from the latter.

Especially preferably, the control apparatus 12 controls the transfer apparatus 9, conveying apparatus 10 and/or switching apparatus 11, conveying apparatus 14 for longitudinal conveying, conveying apparatus 15 for crosswise conveying and/or stopping apparatus 18, wherein the transfer apparatus 9 preferably can be (directly) controlled in supplementation or as an alternative also by the processing apparatus 3 or machine control 20 thereof—in particular when connected to the bus system 13.

The installation or system control 21 is preferably coupled or connected via the (additional) bus system 25 to the processing apparatus 3 or machine controls 20 thereof. However, other types of connections are also possible here.

The control apparatus 12 can be connected to the system control 21 also via the bus system 25 or a separate connection for the data exchange.

The control apparatus 12 can also optionally be formed by the system control 21 or integrated into the latter.

The system control 21 preferably forms a lens management system and/or an installation control.

The system control 21 is used in particular for receiving or collecting jobs O and/or managing jobs O, production data P and/or lens blanks and/or the provision of interfaces to other system, for example to system or modules for the lens design, which determine the desired geometric configuration of lenses 2 and/or the required processing work and/or processing steps in particular based on desired optical properties.

In particular, in the system control 21 (or another server or data storage unit), production data P, which contain in particular processing plans (processing steps and/or processing sequences or series) and processing status (processing states and/or information on processing that is to be performed next), are managed and/or produced.

The production data P are made available in particular by the system control 21 to the processing apparatus 3 or the machine controls 20 thereof and/or can be checked by the latter, as schematically indicated by a corresponding arrow in FIG. 9.

The installation 1 or system control 21 preferably has a control center 26.

The status of the processing apparatus 3, in particular the processing status or production status, the availability of the respective processing apparatus 3, the capabilities and/or tool configuration, the possible processing work and/or other similar information, are forwarded for display and/or management as status information S from the processing apparatus 3 or the machine control 20 thereof, in particular to the system control 21, as indicated by a corresponding arrow in FIG. 9, and/or to the control center 26.

The control center 26 is used in particular in the visualization and/or management of machine conditions, i.e., conditions of processing apparatus 3, production data P, process data and/or other information I.

The control center 26 is preferably also used to manage macros and/or the reporting.

The control center 26 can be corresponding programs, applications or the like, and/or one or more data processors, such as a server or the like. The same is also true for the system control 21 and/or control apparatus 12.

The control center 26 can optionally also be formed by the system control 21 and/or be connected (only) via the latter to the installation 1.

The processing apparatus 3 or the machine controls 20 thereof can preferably also communicate information I, such as process data, and the like, to the control center 26, as indicated by a corresponding arrow in FIG. 9.

The control center 26 can also be connected to the bus system 25 for information or data exchange. As an alternative or in addition, the data exchange can also be carried out via the system control 21.

Preferably, the system control 21 and the control center 26 can exchange production data P and/or other data, such as status information S, for example on the job status, as indicated by arrow P/S in FIG. 9.

Preferably, the system control 21 and the control apparatus 12 can exchange and/or coordinate production data P, as indicated by a corresponding arrow in FIG. 9, and/or status information S, in particular data on the job status, as indicated by a corresponding arrow A in FIG. 9.

For data exchange, the control apparatus 12 is preferably also connected to the additional bus system 25 and/or in some other way or is connected or connectable for the purpose of data exchange.

Preferably, the processing apparatus 3 or the machine controls 20 thereof can exchange job information A, such as information regarding status, in particular job status, queries and/or requests, as indicated by a corresponding arrow in FIG. 9. Especially preferably, queries and job information A can be forwarded to the control apparatus 12 or communicated to the latter and/or a request for a lens 2 or a lens carrier 5 can be forwarded to the control apparatus 12. As an alternative or in addition, information on lenses 2 or lens carriers 5 that are detected or identified preferably by the sensors 16 can be forwarded by the sensors 16 directly or via the control apparatus 12 to individual, multiple, or all processing apparatus 3 or the machine control 20 thereof or can be provided to them. This information exchange is carried out in particular within the scope of the request for new lenses 2 or lens carriers 5 by the processing apparatus 3, as indicated by the double arrow A in FIG. 9. This information exchange can also be carried out taking into consideration additional data or information, in particular process data P, especially preferably processing plans and processing status, which preferably are provided by the system control 21.

In particular, the processing apparatus 3 can preferably automatically select and/or request new jobs or lenses 2 for processing. According to an especially preferred aspect, this makes possible virtually any or independent engaging or insertion of processing apparatus 3 into the installation 1.

The proposed installation 1 and the proposed method for processing optical lenses 2 is very flexible. In particular, an improved or optimized use of processing capacities can be achieved. In addition, a very flexible processing and adaptation to various circumstances is made possible. For example, shutdown times or failures of individual processing apparatus 3 can be compensated very easily and/or in an optimal way, in particular if other or alternative processing apparatus 3 are available. As an alternative or in addition, an intelligent focus control can be carried out, for example to the extent that a processing apparatus 3 that is especially suitable for a specific processing is used primarily for this processing, i.e., for example, a lathe with an especially large shaving space for processing especially long or bulky shavings when lenses 2 are being processed for production.

The proposed installation 1 and the proposed method allow in particular a very great flexibility even in the case of the processing of lenses 2 with different shapes and/or that consist of various materials. In particular, the previously common processing or manufacturing lines, which are primarily oriented to the processing of lenses 2 made from a specific material or lenses 2 of a specific shape, can be avoided.

Another embodiment of the proposed installation 1 is explained below based on FIG. 10, wherein primarily only essential differences or new aspects are dealt with in more detail, so that the preceding remarks and explanations apply in particular correspondingly or in supplementation, even when a repetition in this regard is omitted.

Figure 10:
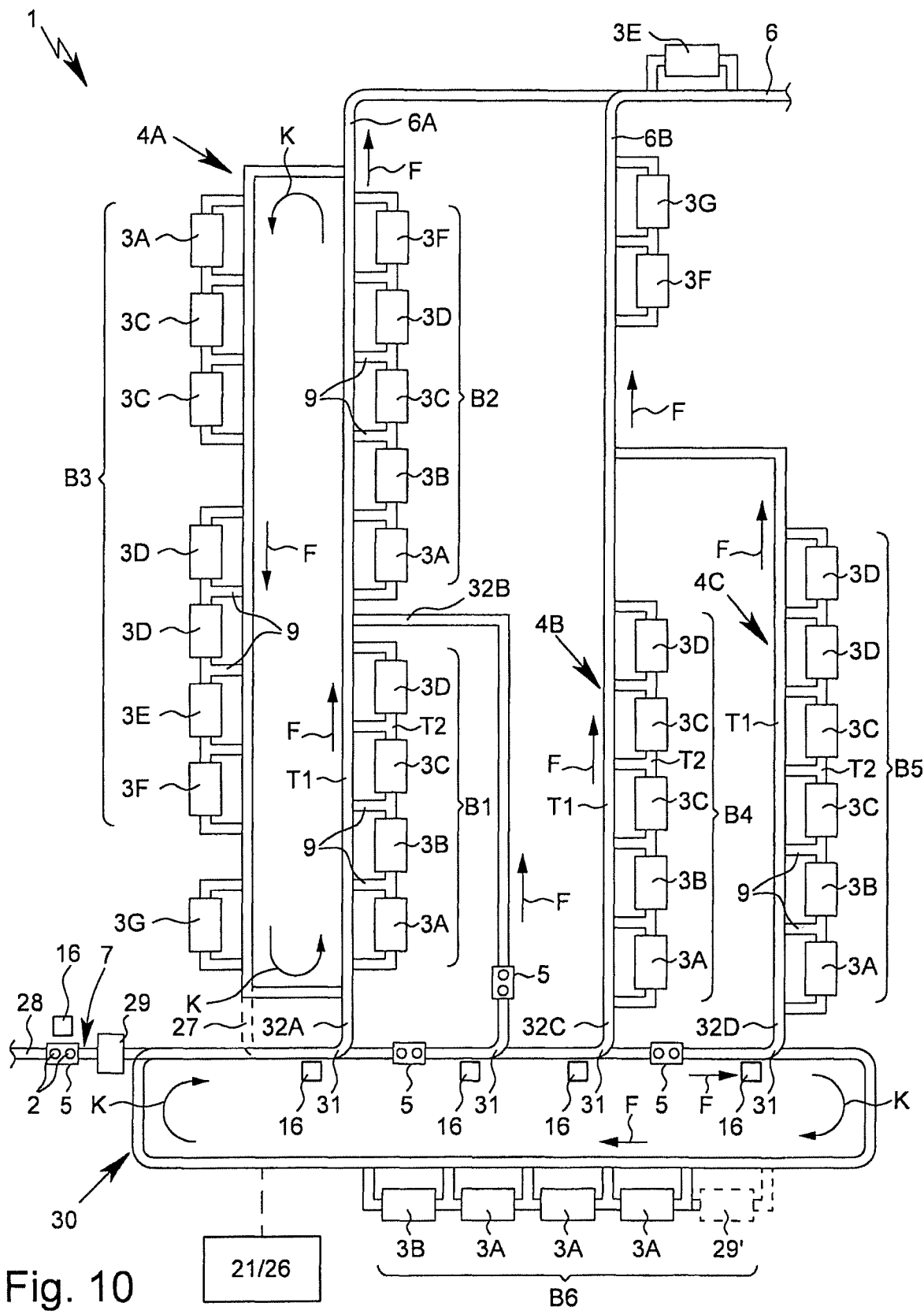
FIG. 10 shows a schematic depiction of a proposed installation with a transport system and multiple processing lines that are connected thereto.

In the embodiment according to FIG. 10, the proposed installation 1 preferably has an in particular upstream or central transport system 30 and multiple processing lines B that are connected thereto, here the processing lines B1 to B5.

Multiple or all processing lines B each have multiple different and/or similar processing apparatus 3, as indicated by way of example in FIG. 10, in particular by different processing apparatus 3A to 3G in the above-defined sense. For example, the processing line B3 or B5 has multiple processing apparatus 3, wherein at least two processing apparatus 3 are designed in the same way or similarly, here two processing apparatus 3C for shaping processing, for example by milling and/or turning, and/or two processing apparatus 3D for polishing.

The workpieces or lenses 2 or lens carriers 5 are conveyed via a corresponding transfer system 4, in particular multiple transfer systems 4A, 4B and 4C, to the processing apparatus 3 of the processing lines B, and they are conveyed away again from it or them, in particular as already explained in detail based on the other embodiments.

In particular, a transfer system 4, here in the illustrative example the transfer system 4A, can be assigned to multiple processing lines B, here to the processing lines B1, B2 and B3, and/or can form a ring arrangement or annular conveying or circular conveying K.

As an alternative or in addition, only one processing line B can be assigned to a transfer system 4. In the illustrative example, (only) the processing line B4 is assigned to the transfer system 4B, and (only) the processing line B5 is assigned to the transfer system 4C.

Especially preferably, the respective processing line B also has an assigned transfer system 4.

The transport system 30 is upstream from the processing lines B or transfer system 4 in order to convey, selectively or as required, the workpieces or lenses 2 that are to be processed or the carriers 5 equipped therewith to the latter—i.e., to the processing lines B and/or transfer system 4. This conveying follows in particular in accordance with an assignment Z, as indicated by way of example in FIG. 11.

Especially preferably, some or all processing lines B and/or transfer systems 4 are connected via one or more branches 31 and feeds 32, in particular via a branch 31 and an own feed 32, to the transport system 30, so that the workpieces or lenses 2 that are to be processed or the carriers 5 equipped therewith can be conveyed preferably separately and/or directly to individual, multiple or all processing lines B.

In the embodiment that is depicted in FIG. 10, for example, the processing lines B1, B2 and B3 and/or the transfer system 4A are connected via a branch 31 and the feed 32A as well as via another branch 31 and the feed 32B to the transport system 30. For example, here, the processing line B1 can be supplied via the feed 32A, and the processing line B2 can be supplied via the feed 32B, in each case directly with workpieces or lenses 2 that are to be processed. This direct conveying or supplying of processing lines B is advantageous with respect to an optimized process sequence and/or especially good installation use and represents an especially preferred, also independently-achievable, aspect of this invention.

In addition, it is also possible, however, that processing lines B are only indirectly connected or supplied with workpieces or lenses 2 that are to be processed. For example, here the processing lines B3 is connected indirectly via the other processing lines B1, B2 and/or the assigned transfer system 4A thus has no own or separate feed 32.

The processing line B or multiple processing lines B, here the processing lines B1, B2 and B3 or their transfer system 4A, preferably form(s) a ring arrangement and/or make(s) possible a circular conveying K, as already described in other embodiments and as indicated in FIG. 10.

A ring arrangement or circular conveying K is, however, not absolutely necessary, even if the latter is advantageous and/or preferred. For example, the transfer systems 4B and 4C with the assigned processing lines B4 and B5 do not form any ring arrangement or circular conveying K, respectively, but rather other arrangements, here in particular linear or straight-line arrangements which can be arranged, for example, beside one another or one behind another.

Some or all processing lines B and/or transfer systems 4 can dispense or release the processed workpieces or lenses 2 preferably to separate and/or common handoffs 6, 6A, 6B, as indicated by way of example in FIG. 10.

As an alternative or in addition, individual processing apparatus 3 can be upstream and/or downstream from individual or multiple processing lines B and/or transfer systems 4, as indicated by way of example in FIG. 10. For example, the processing apparatus 3F and 3G that can be used together are downstream—here in the area of the handoff 6B—from the two processing lines B4 and B5 or the two transfer systems 4B and 4C, which processing apparatus can be used if necessary or selectively. In addition, the common processing apparatus 3E in the area of the handoff 6 is downstream from the processing lines B4, B5 additionally together with the processing lines B1 to B3 and/or from the transfer systems 4B, 4C additionally together with the transfer system 4A, which processing apparatus also can be used selectively or if necessary, but also can be omitted or bypassed.

The transport system 30 preferably also forms a ring arrangement and/or preferably makes possible a circulation or circular conveying K, as indicated in FIG. 10. This is conducive in particular to an intermediate storage of the workpieces or lenses 2 that are to be processed and/or their selective conveying to a desired processing line B and/or a desired transfer system 4, wherein a simple and/or compact structure is made possible.

The preferred combination of at least one ring arrangement or circulation or circular conveying K of the (upstream) transport system 30 with at least one (downstream) ring arrangement or circulation or circular conveying K of a processing line B or a transfer system 4 represents an especially preferred, in particular independently-achievable aspect of this invention. Namely, in this way, an intermediate storage and/or flexible conveying to various processing lines B and/or processing apparatus 3 can be implemented in a simple way.

The installation 1 and/or the transport system 30 preferably has an intake 7 for receiving workpieces or lenses 2 that are to be processed or carriers 5 equipped therewith. The intake 7 is preferably connected or can be connected via an inlet 28 or the like to corresponding other installations or apparatus and/or can be loaded with the workpieces.

The installation 1 or intake 7 or the transport system 30 preferably has a sensor 16 in the area of the inlet 28 or the intake 7 or shortly after to be able to detect new workpieces that are to be processed.

Optionally, the installation 1 or intake 7 or the transport system 30 can also have a storage unit 29 for in particular temporary intermediate storage of workpieces or lenses 2 that are to be processed.

The new workpieces that are to be processed and in particular are already detected are fed into the transport system 30 or the preferred circulation or circular conveyor K.

Figure 11:
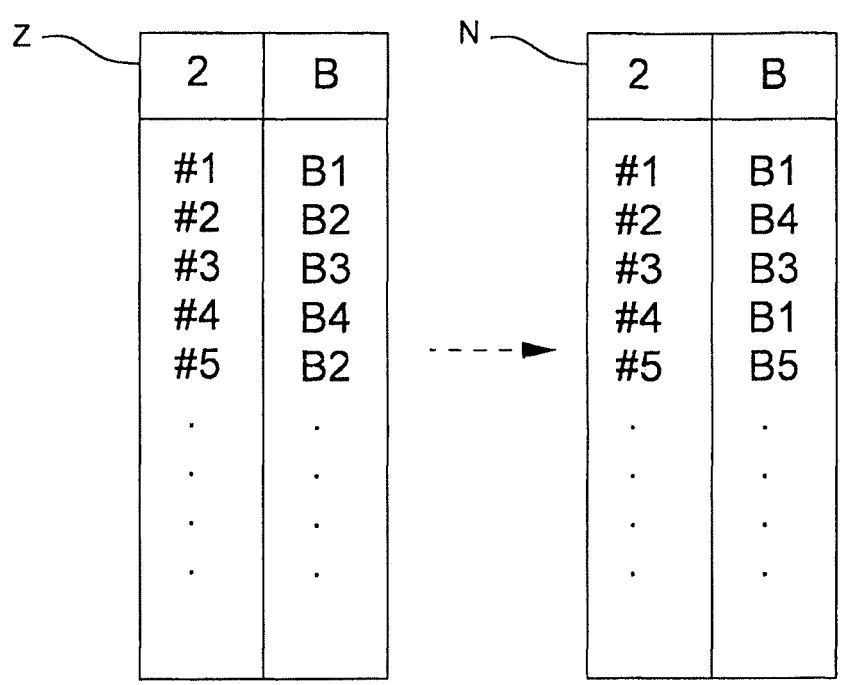
FIG. 11 shows a schematic depiction of a proposed assignment of workpieces that are to be processed to processing lines and the new assignment thereof.

The conveying of the workpieces or lenses 2 that are to be processed or carriers 5 equipped therewith to the respective processing line B or the respective transfer system 4, thus in particular from the transport system 30 via one of the branches 31 and feeds 32, is carried out preferably based on assignment parameters and/or corresponding to a (preceding) assignment Z, as shown in FIG. 11 by way of example. In particular, the assignment Z is carried out based on the assignment parameters.

In the illustrative example, the assignment Z preferably indicates which workpiece (in the depiction according to FIG. 11 identified by way of example by a workpiece number #1, #2, #3, etc.) is assigned to which processing line B and accordingly is to be conveyed to the latter.

The assignment Z can be implemented in particular by a table, a database, or another stored value or entry or the like.

The assignment Z can be carried out individually, in pairs, or in groups, wherein the lenses 2 that are usually to be produced as a pair are especially preferably also assigned as a pair to the same processing line B and are conveyed to said processing line as workpieces that are to be processed.

For the workpieces or lenses 2, the assignment Z can be determined, kept available or managed, in particular by the system control 21, individually, in pairs or combined for multiple or all workpieces or lenses 2, in particular for all that were already detected and still have to be conveyed to one of the processing lines B and/or are still located in the transport system 30.

The assignment parameters take into consideration, reflect and/or comprise in particular job information A, production data P and/or status information S, especially preferably the respective processing plan, necessary processing steps, necessary processing accuracies, requests with respect to the dimensions that are to be processed and/or to the material that is to be processed, requests pertaining to the necessary tools, lists of values, precedence (priority) of jobs, processing work and/or workpieces and/or the availability or capability of individual processing lines B, transfer systems 4 and/or processing apparatus 3. For example, a processing apparatus 3A of a processing line B can be set to block to a certain size, and a processing apparatus 3A of another processing line B can be equipped to block to another size. Taking into consideration such requests and/or assignment parameters, the workpieces or lenses 2 are then assigned and in particular are also conveyed to the appropriate processing lines B.

The (first) assignment Z is carried out preferably by a specified distribution or random distribution, by corresponding requesting of a processing line B or by the system control 21, wherein the assignment Z can be displayed, examined and/or changed preferably by means of the control center 26.

The transport system 30 or the installation 1 preferably begins with the conveying of the workpiece to the respectively assigned processing line B. Especially in the case of larger installations 1, this conveying requires a conveying time that is not insignificant.

According to an especially preferred, also independently-achievable aspect of this invention, the assignment Z of already assigned workpieces or lenses 2 is examined upon detection of a new job O or workpiece (for example by means of the sensor 16 at the intake 7) and/or before actual discharge or transfer of a workpiece from the transport system 30 to the assigned processing line B (thus in particular before the respective branch 31), specifically taking into consideration in particular the current assignment parameters, especially preferably taking into consideration changes in the status parameters after the last assignment Z. The assignment Z is then, if required, adapted to or replaced by a new assignment N.

A change in the assignment Z or new assignment N can be caused by, for example, a processing apparatus 3 of a processing line B that is indispensable for the processing or a processing line B in general or a corresponding transfer system 4 being temporarily or permanently down or blocked or, for example, (over)loaded with other workpieces. In particular, individual workpieces can then be assigned to yet another processing line B, as illustrated by way of example by the new assignment N in FIG. 11. For example, here, the workpiece #2 is now reassigned to the processing lines B4 instead of to processing line B2.

Preferably, the examination of the assignment Z of already assigned workpieces or the new assignment N is thus carried out within the conveying time for individual, multiple or all workpieces.

The proposed examination and optional new assignment N are preferably carried out by the system control 21 or algorithms or macros stored there.

The change and new assignment N optionally can also can be displayed by the control center 26 and/or, if required, checked or corrected by an operator.

The proposed examination of the assignment Z of already assigned workpieces and optional new assignment N makes it possible to adapt the entire system and/or the installation 1 to current circumstances, in particular in the case of changing conditions and requests.

In particular, the examination of the assignment Z and optional new assignment N can be viewed or used as an adaptive pre-control.

It is especially to be emphasized that an optimization of the overall process sequence is made possible, wherein the subunits, here the processing lines B preferably finish or process the jobs O and/or workpieces automatically; thus, in particular, no central control that controls the complete production process sequence on any level is necessary or provided. This is conducive to a simple and/or structured design and/or a simple or modular extension of the installation 1.

In the described assignment Z, the jobs O or workpieces are assigned to the respective processing lines B. Accordingly, the term "line assignment" can also be used here.

The proposed assignment Z or examination thereof and optional new assignment N can also be carried out as an alternative or in addition in the case where workpieces are assigned to individual processing apparatus 3 of a processing line B, i.e., on the "machine level." Such an assignment Z can also be referred to as "machine assignment" and is explained in more detail below by way of example.

The assignment Z of individual workpieces or lenses 2 to a specific processing apparatus 3 (for the next processing work) is done in particular to a corresponding request of the respective processing apparatus 3, as already described. In this connection, corresponding assignment parameters, as already described above, can also be taken into consideration. Thereby, a(n) (first) assignment Z then has been carried out.

The above-mentioned assignment Z or another assignment Z is preferably always updated or managed in the system control 21. Optionally, a display can also be shown, and, as appropriate, corrections can be made via the control center 26 that is not shown in FIG. 1 but is preferably provided.

The assignment Z of already assigned workpieces is preferably examined after or before each processing of a workpiece and/or before each conveying of a workpiece to the assigned processing apparatus 3, for example just when a processing apparatus B requests an assigned workpiece, in particular taking into consideration the then current assignment parameters, and is optionally changed or replaced by a new assignment N.

In the case of a new assignment N, for example, a workpiece that is already to be processed as the next one being shaped in the processing apparatus 3C could then no longer be assigned to this processing apparatus 3C but rather instead another workpiece is assigned that is primarily to be processed, for example. As an alternative or in addition, another processing apparatus 3C (if present) could then if necessary, be used for the original workpiece, i.e., could be reassigned to the latter.

Preferably, the examination of the assignment Z of already assigned workpieces and optional new assignment N is carried out by the installation 1 or processing lines B or control apparatus 21, which is designed in particular in a corresponding manner.

Optionally, the change and new assignment N can also be displayed by the control center 26 and/or as appropriate examined or corrected by an operator.

The proposed examination of the assignment Z of already assigned workpieces and optional new assignment N makes possible an adaptation of the overall system and/or the installation 1 to current circumstances, in particular in the case of changing conditions and requests.

In particular, the examination of the assignment Z and optional new assignment N can be viewed or used as an adaptive pre-control.

It is especially to be emphasized that an optimization of the overall process sequence is made possible, wherein the subunits, here the processing lines B, preferably finish or process the jobs O or workpieces automatically; thus, in particular, no central control that controls the complete production process sequence on any level is necessary or provided. This is conducive to a simple and/or structured design and/or a simple or modular extension of the installation 1.

Optionally, individual or all processing lines B and/or transfer systems 4 can have a (common or separate) rearward conveying connection 27 to the transport system 30, so that in the event a processing line B fails, a rearward conveying and/or reverse feeding of workpieces or lenses 2 that are not processed or not completely processed is possible in order then to assign and to convey those to other processing lines B. Such an optional rearward conveying connection 27 is indicated in dotted lines in FIG. 10. As an alternative or in addition, such a rearward conveying connection 27 can also be provided, for example, between a separate or common handoff 6 and the transport system 30.

According to an especially preferred aspect, the optional storage unit 29 and/or the transport system 30 can also be used in order to pre-sort the lenses 2 that are to be processed and/or blocked for in particular differently-equipped processing apparatus 3A for blocking.

In the illustrative example, the blocking apparatus or processing apparatus 3A of the various processing lines B can be—at least partially—differently-equipped, for example fitted or equipped with block rings of different diameters or for block connections with different diameters. The lenses 2 are then correspondingly assigned and conveyed according to the necessary or desired size of the block connection to the respective block apparatus or processing apparatus 3A.

Especially preferably, a processing line B6 that is especially equipped for the blocking can be formed, i.e., various processing apparatus 3A are combined to form a processing line B with a common transfer system 4 and/or transport system 30 for selective conveying, by which in particular a "block line" is formed. This block line can optionally contain or have the stacker or storage unit 29 in particular for pre-sorting the lenses 2 according to size and/or desired block diameter. Such a block line B6 also represents an independently-achievable aspect.

By way of example, the implementation of such a block line or processing line B6 is also indicated in FIG. 10. This processing line B6 is designed in particular only for blocking or other connecting of the lenses 2 to holders or block pieces that are not shown and/or are upstream from the other processing lines B. The block line B6 can preferably have an own stacker or storage unit 29, as indicated in dotted lines in FIG. 10, in particular for pre-sorting the lenses 2, especially preferably according to (necessary or appropriate or desired) block size.

The term "block size" is preferably defined as the size or the diameter of the connection between lens 2 and holder or block piece or the surface on the lens 2 that is necessary for this purpose. The blocking apparatus or processing apparatus 3A of the processing line B6 are preferably adjusted for or set to various block sizes, for example by means of block rings of different sizes or the like.

The lenses 2 are preferably assigned by the system control 21 corresponding to the appropriate or desired block size to the various processing apparatus 3A. The conveying is then carried out by means of the transfer or transport system 4, 30 of the processing line B6 to the respective processing apparatus 3B corresponding to the assignment Z.

According to an also independently-achievable aspect, a proposed method and the proposed installation 1 are distinguished in particular by the provision or implementation of the described block line B6 and/or the assignment Z of lenses 2 according to block size to various processing apparatus 3A for blocking.

The block line B6 can also be combined as desired with other processing lines B to a processing line B.

In general, it is noted that each of the processing lines B, by themselves and/or together with other processing lines B, make possible or achieve an already-described ring arrangement or circulation or circular conveying K, in particular by a corresponding design of the related or assigned transfer or transport system 4, 30.

Another embodiment of the proposed installation 1 or a proposed system 33 for processing preferably optical workpieces or lenses 2, especially preferably eyeglass lenses, is explained below based on FIG. 12, wherein the subsequent description is limited to essential new aspects. The preceding remarks and explanations apply in particular correspondingly or in supplementation, even when not repeated.

The system 33 comprises a first installation 1A at a first site 34 as well as a second installation 1B at another, second site 35. In particular, the two installations 1A and 1B are located in different buildings and/or on different premises or in different towns, countries, or continents.

The installations 1A and 1B each represent an installation 1 for processing preferably optical workpieces, in particular lenses 2, in the already-described sense, so that the previous remarks and explanations in the general description and relative to FIGS. 1 to 11 apply preferably correspondingly or in supplementation. In particular, the installations 1A and 1B can be built according to the previously-described embodiments or in a similar way.

The two installations 1A and 1B can be largely identical in construction, but if necessary can also be built differently.

In the illustrative example, only a few essential components of the installations 1A and 1B are indicated.

In particular, each of the installations 1A and 1B have a storage unit 29 with workpiece blanks for processing as required. For the sake of simplification, these blanks or workpieces are not depicted.

The installations 1A, 1B each preferably have an intake 7 and/or a transport system 30 and/or at least one processing line B with corresponding processing apparatus 3 as well as preferably a transfer system 4 and/or a handoff 6.

Figure 12:
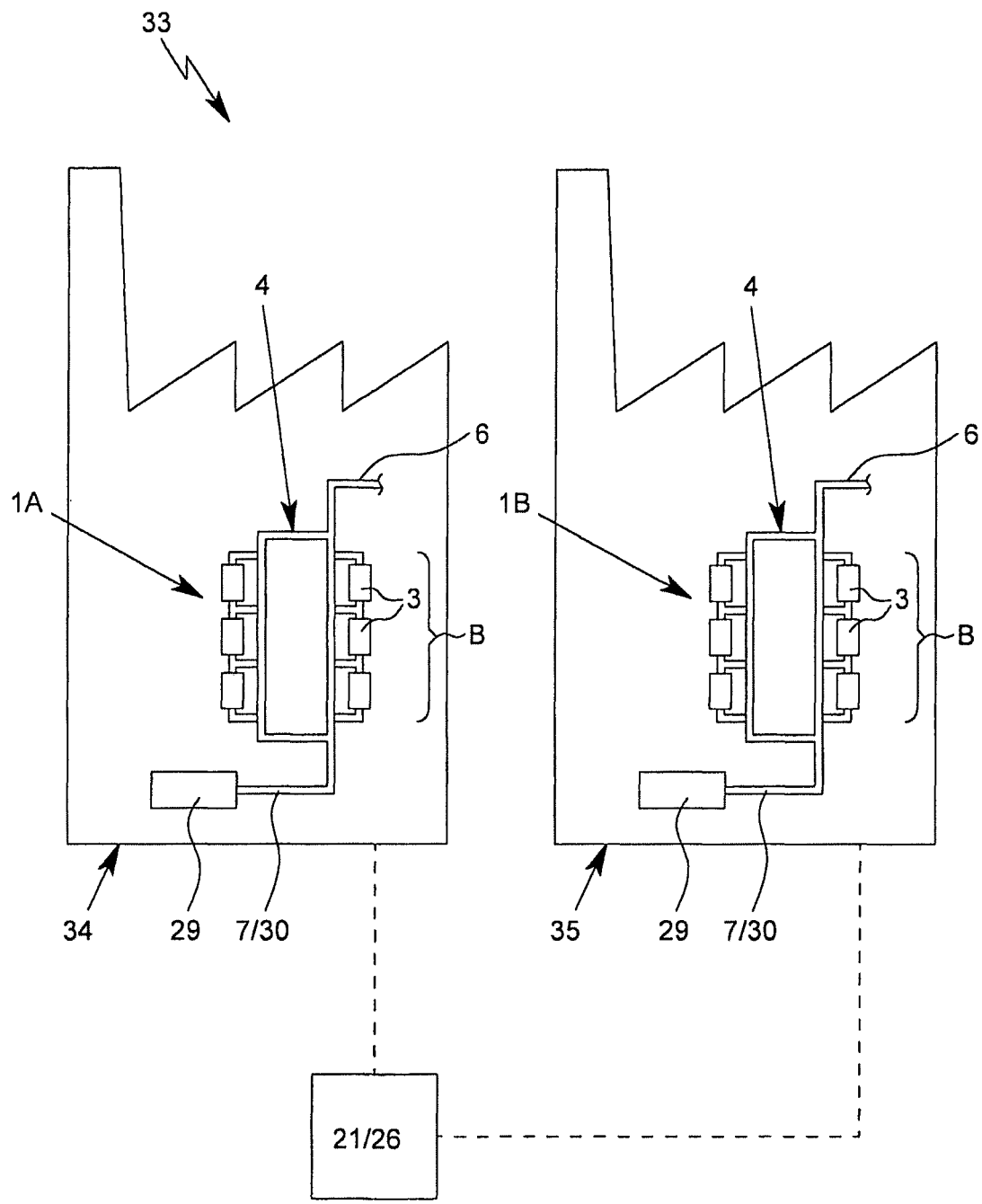
FIG. 12 shows a schematic depiction of a proposed system with two installations for processing at different sites.

The system 33 preferably also has the system control 21 and optionally the control center 26, as indicated in FIG. 12.

The system control 21 preferably serves to manage jobs O of workpieces or lenses 2, especially preferably eyeglass lenses, which are to be produced or processed.

A preferred aspect lies in the fact that the system control 21 manages the jobs O for the processing of workpieces and correspondingly forwards an assignment Z selectively to the first or second installation 1A, 1B. Thus, an especially efficient processing and/or optimal utilization of the installations 1A and 1B and thus of the entire system 33 can be achieved.

Preferably, no workpiece blanks are sent to the individual installations 1A, 1B or sites 34, 35 for individual jobs O, but rather only the jobs O are in particular electronically forwarded and workpiece blanks are used which are present at the respective installation 1A or 1B or the respective site 34, 35 in order to process these locally then in the desired way according to the respective job O.

After the processing, the workpieces are preferably sent to a desired delivery address or distributed in some other way.

In the case of the assignment Z of the jobs O to the respective installation 1A or 1B, assignment parameters, as already described above, are preferably taken into consideration. As an alternative or in addition, the assignment parameters can also comprise, reflect or take into consideration the availability, utilization and/or capability of the installations 1A and 1B or individual processing lines B of these installations 1A, 1B.

Especially preferably, the assignment Z is carried out again in or by the system control 21, wherein this assignment Z can be displayed, monitored and/or, if necessary, changed preferably by the optional control center 26.

Especially preferably, the assignment Z of already assigned jobs O is examined in the case of detection of a new job O and/or in each case before the actual beginning of the processing of a workpiece in the installation 1A or 1B—in particular before the removal of a lens blank from the storage unit 29 as a first processing step—in particular taking into consideration the current assignment parameters or changes of the assignment parameters that occurred in the meantime, and optionally changed or replaced by a new assignment N. For example, jobs O that already have been forwarded to an installation 1A or 1B are then deleted there and forwarded, i.e., "rerouted," to the other installation 1B or 1A.

The examination of the assignment Z of already assigned jobs O and the optional change or new assignment N is preferably carried out by the system 33 or the system control 21 thereof, which in this respect is/are in particular designed in a corresponding way.

Optionally, the change and new assignment N can also be displayed by the control center 26 and/or, as appropriate, examined or corrected, for example by an operator.

The proposed examination of the assignment Z of already assigned jobs O and optional new assignment N makes possible an adaptation of the entire system 33 to current circumstances, in particular in the case of changing conditions and requests.

In particular, the examination of the assignment Z and optional new assignment N of the jobs O can be viewed or used as an adaptive pre-control.

It is especially to be emphasized that an optimization of the overall process sequence is made possible, wherein the subunits, here the installations 1A and 1B, preferably finish the jobs O automatically; thus, in particular, no central control that controls the complete production process sequence on any level is necessary or provided. This is conducive to a simple and/or structured design and/or a simple and/or modular extension of the system 33.

The system 33 can also comprise multiple installations 1 at a site 34 or 35 and/or at least one additional site (not shown) in addition to the two sites 34 and 35.

The system 33 can optionally also comprise a system control 21 for each installation 1A, 1B and/or each site 34, 35, wherein the system controls then preferably communicate with one another and/or are crosslinked in such a way that a system control 21 in the proposed sense is thus formed overall.

The system control 21 is preferably central or arranged on one of the two sites 34 or 35 and/or distributed in multiple sites or other locations. For example, this can be a server on which corresponding programs or macros run and which can be accessed remotely.

In general, the system control 21 can also be implemented and/or controlled, if necessary, in a location-independent manner by the respective installation 1 or the installations 1A, 1B. The same preferably also applies for the optional control center 26.

The proposed assignment Z of jobs O to different installations 1A, 1B or sites 34, 35 and corresponding forwarding can also be referred to as "installation assignment."

The preferred examination and optional change or new assignment of the installation assignment represents an especially preferred, also independently-achievable, aspect.

Especially preferably, the machine assignment, line assignment and installation assignment can also be combined with one another as desired and/or implemented and/or performed and/or examined and/or changed or reassigned by the same system control 21 or different system controls 21.

In particular, a method, an installation 1 and a system 33 for processing optical workpieces are proposed. The workpieces are conveyed to individual processing apparatus 3 or processing lines 8 corresponding to an assignment Z. The respective assignment Z preferably takes into consideration assignment parameters, such as the availability and capability of processing apparatus 3 or processing lines B. The assignment Z that already has been carried out is examined before the actual or ultimate conveying and/or when there is a change in the assignment parameters and optionally is changed in a corresponding manner, taking into consideration the current assignment parameters in order to adapt to current circumstances. As an alternative or in addition, jobs O for processing workpieces are forwarded to the processing installations 1A, 1B at different sites 34, 35 based on corresponding assignment parameters. Optionally, an examination and, as appropriate, a change in the assignment Z are made when new jobs O and/or significant changes in the assignment parameters are detected. Accordingly, an especially efficient processing is made possible.

In addition, the proposed installation 1, the proposed system 33 and the proposed method make possible an especially good use of available tools, processing apparatus 3, processing lines B, installations 1 or other operating means.

The system control 21 and/or the control center 26 and/or the control apparatus 12 is/are implemented in particular by a memory-programmable control and/or an HMI (human-machine interface) or is/are provided therewith.

Individual aspects and features of the described installation 1 and systems 33 as well as the described process sequences, methods and various embodiments can also be implemented independently of one another, but also in any combination.

What is claimed is:

1. A method for processing eyeglass lenses, comprising:
conveying eyeglass lenses by means of a transport system to a plurality of processing lines corresponding to an assignment of an overall process sequence for producing the eyeglass lenses with the plurality of processing lines,
assigning eyeglass lenses to a processing line for processing,
examining the assignment of assigned eyeglass lenses in at least one of the cases: upon detection of a new eyeglass lens or job that is to be processed, and before actual transfer of an eyeglass lens from the transport system to the assigned processing line; and
changing at least one of the plurality of processing lines of the overall process sequence to at least one new processing line if the examination indicates that processing should be performed on a different processing line for performance of the overall process sequence with a modified set of processing lines.

2. The method according to claim 1, wherein the processing line assignment or the new processing line assignment is carried out based on assignment parameters, the assignment parameters comprising at least one of a status, utilization, availability and capability of at least one of a processing apparatus, processing lines and tools thereof.

3. Method according to claim 2, wherein the eyeglass lenses are conveyed past any processing apparatus not to be used for processing via a parallel transport track.

4. The method according to claim 1, wherein a system control manages a processing status for the eyeglass lenses that are to be processed, wherein after the processing has been completed, at least one processing apparatus used for processing communicates a resulting new processing state of the processed eyeglass lenses to the system control.

5. The method according to claim 1, wherein, after processing has been carried out, at least one processing apparatus used for processing hands off the eyeglass lens to a transfer system and automatically requests a new eyeglass lens.

6. The method according to claim 1, wherein the eyeglass lenses are conveyed past any processing apparatus not to be used for processing via a parallel transport track.

7. A method for processing eyeglass lenses, comprising:
conveying a plurality of eyeglass lenses by means of a transfer system to a plurality of independently-operating processing apparatus corresponding to a processing assignment or request of an overall process sequence for producing the plurality of eyeglass lenses with the plurality of independently-operating processing apparatus, and
examining the processing assignment of assigned eyeglass lenses after or before each processing or before each conveying and changing the processing assignment of the overall process sequence to a new processing assignment if the examination indicates that processing should be performed on at least one different processing apparatus for performance of the overall process sequence with a modified set of processing apparatus.

8. The method according to claim 7, wherein the processing assignment or the new processing assignment is carried out based on assignment parameters, the assignment parameters comprising at least one of the status, utilization, availability and capability of at least one of the processing apparatus, processing lines and the tools thereof.

9. The method according to claim 7, wherein a system control manages the processing status for the eyeglass lenses that are to be processed, wherein after processing has been completed, the processing apparatus communicates the new processing state of the processed eyeglass lenses to the system control.

10. Method according to claim 7, wherein, after processing has been carried out, the processing apparatus hands off the eyeglass lens processed to a transfer system and automatically requests a new eyeglass lens.

11. A method for processing eyeglass lenses, comprising:
managing a plurality of processing jobs for processing of eyeglass lenses by a system control, and according to a processing assignment of an overall process sequence for producing the eyeglass lenses with the plurality of processing jobs, selectively forwarding the lenses for the processing assignment either to a first installation with a plurality of processing lines for performance of the processing jobs at a first site, or
forwarding the eyeglass lenses to a second installation with a plurality of processing lines for performance of the processing jobs at a second site,
examining the assignment of assigned eyeglass lenses upon at least one of detection of a new eyeglass lens or a new job that is to be processed, or before actual transfer of an eyeglass lens to an assigned processing line, and
changing a processing line assignment to a new processing line assignment if the examining of the assignment indicates that processing should be performed on a different processing line for performance of said jobs of the overall process sequence with a modified processing line assignment.

12. An installation for processing eyeglass lenses, comprising:
a transport system,
multiple processing lines connected to the transport system, and a system control,
  wherein each of the processing lines has multiple processing apparatus for processing of eyeglass lenses in an overall process sequence, at least one of the processing lines having a different set of multiple processing apparatus than another of the processing lines,
  wherein the system control has means for assigning of eyeglass lenses to a respective processing line based on assignment parameters,
  wherein the transport system is configured for conveying eyeglass lenses to the processing lines to which the eyeglass lenses have been assigned,
  wherein the system control has means for examining the assignment of already-assigned eyeglass lenses in at least one of the cases: upon detection of a new eyeglass lens or job that is to be processed, and before the actual transfer of an eyeglass lens to the assigned processing line; and
  wherein the processing line assignment is replaced by a new assignment if required as a result of said examining of the assignment for performance of the overall process sequence with a modified set of processing apparatus.

13. The installation according to claim 12, wherein the assignment parameters comprise at least one of the status, the availability and the capability of at least one of the processing apparatus, processing lines and the tools thereof.

14. The installation according to claim 12, wherein the assignment parameters comprise at least one of a number and the estimated processing time of the eyeglass lenses that are assigned or conveyed to at least one of the processing lines and processing apparatus.

15. The installation according to claim 12, wherein the system control has means for keeping current processing plans and current processing status of the eyeglass lenses available.

16. The installation according to claim 15, wherein the assignment or the new assignment is carried out based on assignment parameters.

17. The installation according to claim 12, wherein after the processing is carried out in the processing apparatus, the new processing status is communicated to the system control, and the processing apparatus transfers the processed eyeglass lens again to the transfer system to make the processing apparatus available for another assignment.

18. The installation according to claim 12, wherein the assignment parameters comprise at least one of the status, the availability and the capability of at least one of the processing apparatus, processing lines and tools thereof.

19. The installation according to claim 12, wherein the assignment parameters comprise at least one of a number and the estimated processing time of the eyeglass lenses that are assigned or conveyed to at least one of the processing lines and processing apparatus.

20. The installation according to claim 12, wherein the system control keeps the processing plans and processing status of the eyeglass lenses available for monitoring during the assignment.

21. The installation according to claim 12, wherein after the processing is carried out in the processing apparatus, a new processing status is communicated to the system control, and the processing apparatus transfers the processed eyeglass lens to the transfer system to make the processing apparatus available for use.

22. An installation for processing eyeglass lenses, comprising:
  a transfer system,
  multiple processing apparatus that are connected to the transfer system and
  a system control,
  wherein the multiple processing apparatus form a processing line,
  wherein the transfer system is configured for conveying eyeglass lenses to selected processing apparatus corresponding to an assignment of overall process sequence for processing of the eyeglass lenses,
  wherein the system control or the processing line has means for assigning eyeglass lenses to a respective one of the multiple processing apparatus at least for a next processing, and
  wherein the system control or the processing line has means for examining the assignment of eyeglass lenses to be processed after or before each processing by a selected processing apparatus or before each conveying of eyeglasses lenses to the selected processing apparatus, and for replacing the assignment selected processing apparatus in the overall process sequence with another processing apparatus if required.

* * * * *